United States Patent
Bourquin et al.

(10) Patent No.: US 12,248,094 B2
(45) Date of Patent: Mar. 11, 2025

(54) HANDHELD PERSONAL CARE DEVICE AND A METHOD OF ESTIMATING A POSITION AND/OR AN ORIENTATION OF A HANDHELD PERSONAL DEVICE RELATIVE TO A SUBJECT

(71) Applicant: KONINKLIJKE PHILIPS N.V., Eindhoven (NL)

(72) Inventors: Yannyk Parulian Julian Bourquin, Eindhoven (NL); Martin Jurna, Den Bosch (NL); Vincentius Paulus Buil, Veldhoven (NL); Jonathan Alambra Palero, Noord-Brabant (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1221 days.

(21) Appl. No.: 16/491,192

(22) PCT Filed: Mar. 7, 2018

(86) PCT No.: PCT/EP2018/055521
§ 371 (c)(1),
(2) Date: Sep. 5, 2019

(87) PCT Pub. No.: WO2018/162512
PCT Pub. Date: Sep. 13, 2018

(65) Prior Publication Data
US 2020/0033448 A1    Jan. 30, 2020

(30) Foreign Application Priority Data
Mar. 10, 2017   (EP) ..................... 17160254

(51) Int. Cl.
*G01S 7/48*    (2006.01)
*A46B 15/00*   (2006.01)
(Continued)

(52) U.S. Cl.
CPC ........ *G01S 7/4808* (2013.01); *A46B 15/0004* (2013.01); *A46B 15/0036* (2013.01);
(Continued)

(58) Field of Classification Search
CPC ............ G01S 7/4808; A61H 2003/063; A46B 15/0036; A46B 15/0004
See application file for complete search history.

(56) References Cited

U.S. PATENT DOCUMENTS 4,893,025 A    1/1990  Lee
5,838,238 A *  11/1998 Abita ................. A61H 3/061
                                                340/407.1
(Continued)

FOREIGN PATENT DOCUMENTS

JP    2004130153 A      4/2004
KR    20130085783 A  *  7/2013
WO    2014/191184      12/2014

OTHER PUBLICATIONS

Machine translation of KR20130085783A (Year: 2013).*
(Continued)

*Primary Examiner* — Yuqing Xiao
*Assistant Examiner* — Zhengqing Qi

(57) ABSTRACT

A handheld personal care device having one or more light emitting elements and one or more light receiving elements is disclosed. Each of the light receiving elements is configured to receive light and output a respective measurement signal representing measurements of the received light. The handheld personal care device also has a control unit to estimate a position and/or an orientation of the device relative to a subject. The light emitting elements and the light receiving elements are arranged on the device such that, depending on the position and/or the orientation of the device relative to the subject, at least one of the light receiving elements can receive light emitted by at least one (Continued)

of light emitting elements and reflected by a reflective surface in the environment of the subject. The control unit estimates the position and/or the orientation of the device relative to the subject based on an analysis of the respective measurement signals of the light receiving elements.

20 Claims, 7 Drawing Sheets

(51) Int. Cl.
G01S 7/481 (2006.01)
G01S 17/42 (2006.01)
B26B 19/38 (2006.01)
B26B 21/40 (2006.01)

(52) U.S. Cl.
CPC .......... *G01S 7/4815* (2013.01); *G01S 7/4816* (2013.01); *G01S 17/42* (2013.01); *A46B 2200/1066* (2013.01); *B26B 19/388* (2013.01); *B26B 21/4056* (2013.01)

(56) References Cited

U.S. PATENT DOCUMENTS

| | | | |
|---|---|---|---|
| 6,611,141 B1 | 8/2003 | Schulz | |
| 6,710,706 B1* | 3/2004 | Withington | B63C 11/26 340/407.1 |
| 7,755,744 B1* | 7/2010 | Leberer | G09B 21/003 434/114 |
| 10,317,200 B1* | 6/2019 | Han | G01B 11/26 |
| 11,186,001 B2 | 11/2021 | Uit De Bulten | |
| 2002/0027548 A1 | 3/2002 | Yoneno | |
| 2005/0237517 A1 | 10/2005 | McHugh | |
| 2006/0210090 A1 | 9/2006 | Shennib | |
| 2012/0212453 A1* | 8/2012 | Huang | G06F 3/0421 345/175 |
| 2012/0227554 A1 | 9/2012 | Beech | |
| 2012/0246858 A1* | 10/2012 | De Vries | A46B 15/0014 15/167.1 |
| 2014/0022528 A1* | 1/2014 | Lee | G06F 3/011 356/4.01 |
| 2014/0071258 A1* | 3/2014 | Gandyra | G01B 11/2545 348/77 |
| 2015/0044629 A1 | 2/2015 | Wang | |
| 2015/0197016 A1 | 7/2015 | Krenik | |
| 2015/0321365 A1 | 11/2015 | Lauritsen | |
| 2016/0107323 A1 | 4/2016 | Krans | |
| 2018/0045827 A1* | 2/2018 | Yoon | G01J 1/0204 |
| 2018/0322947 A1 | 12/2018 | Hardeman | |
| 2019/0018136 A1* | 1/2019 | Jacobs | G01S 7/4813 |

OTHER PUBLICATIONS

Alam et al., "Study of Construction a Technical Device Named Walking Stick for the Blind Using GPS," International Journal of Innovations in Engineering and Science 1(1):30-36, 2014. (Year: 2014).*

International Search Report and Written Opinion Dated May 15, 2018 for International Application No. PCT/EP2018/055521 Filed Mar. 7, 2018.

* cited by examiner

HANDHELD PERSONAL CARE DEVICE AND A METHOD OF ESTIMATING A POSITION AND/OR AN ORIENTATION OF A HANDHELD PERSONAL DEVICE RELATIVE TO A SUBJECT

CROSS REFERENCE TO RELATED APPLICATIONS

This application is the U.S. National Phase application under 35 U.S.C. § 371 of International Application No. PCT/EP2018/055521 filed Mar. 7, 2018, published as WO 2018/162512 on Sep. 13, 2018, which claims the benefit of European Patent Application Number 17160254.3 filed Mar. 10, 2017. These applications are hereby incorporated by reference herein.

FIELD OF THE INVENTION

The invention relates to a handheld personal care device, such as a shaver or toothbrush, and techniques for estimating a position and/or an orientation of a handheld personal device relative to a subject.

BACKGROUND OF THE INVENTION

It is envisaged that handheld personal care devices, such as electric shavers, razors, toothbrushes (electric and non-electric), air floss devices, skin treatment applicators, facial cleansers, eye energisers, epilators, etc., will start to offer a more meaningful interaction between a user and the device. The prevalence of "connected products" (e.g. products that are connected to the Internet or a home network) is increasing and such products have sensing functionality to generate data about the use or operation of the products. The functionality of handheld personal care devices could be improved by exploiting the data that has become available. Solutions can be personalised, tuned to the moment and will create improved primary performance and experience.

An important aspect of providing personalised information and tuning to the moment is the position of the device relative to the body of the subject (i.e. the person that the device is being used on). This localisation information could allow the device to automatically adjust its settings to the location in order to optimise the performance (for example different treatment areas have different characteristics and thus different treatment demands). Furthermore, localisation information could provide other valuable information to the user or subject, such as usage logging, overtreatment warning, advice (e.g. the setting that it is best to be used based on the results of previous treatments), feedback (e.g. progress of treatment results) and compliance to a treatment procedure or treatment program. Finally, such information could also be sent through the Internet and made available to the manufacturer of the device. Combining information from a multitude of users can provide new insights into the use of devices by consumers.

Handheld personal care devices are controlled by a user and conventionally they do not comprise or use any sensor to detect their location and orientation during use. Having the ability to detect the orientation of the device during use and/or the position of the device relative to a subject (e.g. where on the body of the subject the device is being used) is useful, and in some cases could be used to adapt one or more operating parameters of the device to the benefit of the user or subject.

For example, in the case of facial cleansers with a rotating brush, the brush will typically rotate in one direction which does not provide the optimal treatment to all locations on the face. Instead, it can be useful for the direction of rotation of the brush to depend on whether the device is being used on the left or right side of the face. Currently this change in direction can be achieved manually by the user by pressing a button, or can be based on a specific treatment time after which the direction of the brush is automatically changed. However, an improved automated system would be useful.

Current systems for determining the position and/or the orientation of a personal care device relative to a subject or user can make use of accelerometers and/or gyroscopes or another form of inertial measurement unit (IMU) to determine the absolute orientation of the device in relation to gravity, and the relative orientation on other axes. However, these systems suffer from accumulated error or drift over time and require regular recalibration. Alternatively, systems can use a locally-generated static magnetic field to determine the exact position and orientation of the device in relation to the subject's head. However, the subject needs to wear ear plugs or another type of head-mounted device to generate the magnetic field (or sense the magnetic field if it is generated by the device) in order for the device to sense its position and orientation in relation to the ear plugs. In yet another alternative, a remote camera can be used to monitor the subject, and image processing techniques can be used to identify the subject, the device and their relative positions. However, this solution creates privacy concerns, particularly if the camera is located in a bathroom, and requires complex image processing techniques.

WO 2014/191184 A1 discloses a hair cutting device comprising a sensor to detect the presence of a particular substance on the hair and/or the skin of a user. The hair cutting device comprises a controller which controls the operation of the hair cutting device in dependence on whether or not the sensor detects the presence of said substance on hairs and/or part of the skin where the hair cutting device is actually present. With this hair cutting device, by selectively applying the substance on parts of the skin before the treatment, the user can select particular parts of the skin that need to be treated by the device or that need not to be treated by the device, or the user can select particular parts of the skin that need to be treated in different ways. Thus the user can for example select a particular hair cutting pattern, which the hair cutting device will subsequently realize in an automatic way.

Therefore, there is a need for an improved technique for estimating a position and/or an orientation of a handheld personal device relative to a subject.

SUMMARY OF THE INVENTION

According to a first aspect of the invention, there is provided a handheld personal care device, the device comprising one or more light emitting elements, each configured to emit light; one or more light receiving elements, each configured to receive light and to output a respective measurement signal representing measurements of the received light; and a control unit that is configured to estimate a position and/or an orientation of the device relative to a subject; wherein the one or more light emitting elements and the one or more light receiving elements are arranged on the device such that, depending on the position and/or the orientation of the device relative to the subject, at least one of the one or more light receiving elements can receive light emitted by at least one of the one or more light emitting elements and reflected by a reflective surface in an environment of the subject; wherein the control unit is configured to estimate the position and/or the orientation of the device relative to the subject based on an analysis of the respective measurement signals of the one or more light receiving elements to determine, for each of the one or more light receiving elements, (i) whether the light receiving element has received light from at least one of the one or more light emitting elements, and/or (ii) from which of the one or more light emitting elements the light receiving element has received light.

In some embodiments, the control unit is configured to determine from the analysis of the respective measurement signals of the one or more light receiving elements which of the one or more light emitting elements and which of the one or more light receiving elements are facing the reflective surface. In these embodiments, the control unit may be configured to estimate the position and/or the orientation of the device relative to the subject based on which of the one or more light emitting elements and which of the one or more light receiving elements are determined to be facing the reflective surface.

In a preferred embodiment, the device comprises one single light emitting element and a plurality of light receiving elements, wherein the light emitting element and the plurality of light receiving elements are arranged on the device such that, depending on the position and/or the orientation of the device relative to the subject, at least one of the plurality of light receiving elements can receive light emitted by the light emitting element and reflected by the reflective surface; wherein the control unit is configured to determine from the respective measurement signals of the plurality of light receiving elements which of the plurality of light receiving elements has received light from the light emitting element, and to estimate the position and/or the orientation of the device relative to the subject based on which of the plurality of light receiving elements has received light from the light emitting element.

In the above embodiment, a first one of the plurality of light receiving elements may be arranged on a first side of the device such that, in a first position and/or a first orientation of the device relative to the subject, said first one of the plurality of light receiving elements receives light from the light emitting element reflected by the reflective surface, and a second one of the plurality of light receiving elements may be arranged on a second side of the device, wherein the first side is different to the second side, such that, in a second position and/or a second orientation of the device relative to the subject, the second one of the plurality of light receiving elements receives light from the light emitting element reflected by the reflective surface.

In the above embodiment, said first one of the plurality of light receiving elements can be arranged on the first side of the device such that said first one of the plurality of light receiving elements does not receive light from the light emitting element when the device is in the second position and/or the second orientation relative to the subject, and said second one of the plurality of light receiving elements can be arranged on the second side of the device such that said second one of the plurality of light receiving elements does not receive light from the light emitting element when the device is in the first position and/or the first orientation relative to the subject.

In an alternative preferred embodiment, the device comprises a plurality of light emitting elements and one single light receiving element, wherein the plurality of light emitting elements and the light receiving element are arranged on the device such that, depending on the position and/or the orientation of the device relative to the subject, the light receiving element can receive light emitted by at least one of the plurality of light emitting elements and reflected by the reflective surface; wherein the control unit is configured to determine from the measurement signal of the light receiving element which of the plurality of light emitting elements the light receiving element has received light from, and to estimate the position and/or the orientation of the device relative to the subject based on which of the plurality of light emitting elements the light receiving element has received light from.

In the above embodiment, a first one of the plurality of light emitting elements may be arranged on a first side of the device such that, in a first position and/or a first orientation of the device relative to the subject, the light receiving element receives light from said first one of the plurality of light emitting elements reflected by the reflective surface, and a second one of the plurality of light emitting elements may be arranged on a second side of the device, wherein the first side is different to the second side, such that, in a second position and/or a second orientation of the device relative to the subject, the light receiving element receives light from said second one of the plurality of light emitting elements reflected from the reflective surface.

In the above embodiment, said first one of the plurality of light emitting elements may be arranged on the first side of the device such that the light receiving element does not receive light from said first one of the light emitting elements when the device is in the second position and/or the second orientation relative to the subject, and said second one of the plurality of light emitting elements may be arranged on the second side of the device such that the light receiving element does not receive light from said second one of the plurality of light emitting elements when the device is in the first position and/or the first orientation relative to the subject.

In some embodiments, the device comprises one single light emitting element and one single light receiving element that are arranged on the device such that, in a first position and/or a first orientation of the device relative to the subject, the light receiving element can receive light emitted by the light emitting element and reflected by the reflective surface and, in a second position and/or a second orientation of the device relative to the subject, the light receiving element cannot receive light from the light emitting element; wherein the control unit is configured to determine from the measurement signal of the light receiving element whether the light receiving element has received light from the light emitting element, and to estimate whether the device is in the first position and/or the first orientation or in the second position and/or the second orientation relative to the subject based on whether the light receiving element has received light from the light emitting element.

In another preferred embodiment, the device comprises a plurality of light emitting elements and a plurality of light receiving elements, wherein the plurality of light emitting elements and the plurality of light receiving elements are arranged on the device such that, depending on the position and/or the orientation of the device relative to the subject, at least one of the plurality of light receiving elements can receive light emitted by at least one of the light emitting elements and reflected by the reflective surface; wherein the control unit is configured to determine from the respective measurement signals of the plurality of light receiving elements which of the plurality of light receiving elements has received light from which of the plurality of light emitting elements, and to estimate the position and/or the orientation of the device relative to the subject based on which of the plurality of light receiving elements has received light from which of the plurality of light emitting elements.

In some embodiments, the control unit is configured to analyse each respective measurement signal of the one or more light receiving elements to determine whether at least one of the one or more light receiving elements has received light from an external light source in the environment of the subject; wherein the control unit is further configured to estimate the position and/or the orientation of the device relative to the subject based on whether at least one of the one or more light receiving elements has received light from the external light source.

In some embodiments, the one or more light receiving elements are each configured to output a respective measurement signal representing measurements of the received light and indicating a direction from which the received light has been received; wherein the control unit is configured to analyse each respective measurement signal of the one or more light receiving elements to determine whether at least one of the one or more light receiving elements has received light from an external light source in the environment of the subject and to determine the direction of the external light source relative to the device; wherein the control unit is further configured to estimate the position and/or the orientation of the device relative to the subject based on whether at least one of the one or more light receiving elements has received light from the external light source and the direction of said external light source relative to the device.

In some embodiments, the device further comprises one or more sensors for measuring the orientation of the device.

In some embodiments, the device further comprises a personal care component for use in performing a personal care activity on the subject. In these embodiments, the control unit can be further configured to output a control signal to the personal care component to adjust one or more operating parameters of the personal care component based on the estimated position and/or the estimated orientation of the device relative to the subject.

In some embodiments, the device comprises a plurality of light emitting elements, and each of the plurality of light emitting elements is configured to emit light having a different wavelength, modulation and/or polarisation as compared to the light emitted by each other of the plurality of light emitting elements.

According to a second aspect of the invention, there is provided a method of estimating a position and/or an orientation of a handheld personal care device relative to a subject, the device comprising one or more light emitting elements and one or more light receiving elements that are arranged on the device such that, depending on the position and/or the orientation of the device relative to the user, at least one of the one or more light receiving elements can receive light emitted by at least one of the one or more light emitting elements and reflected by a reflective surface in the environment of the subject, the method comprising emitting light using the one or more light emitting elements; receiving light using the one or more light receiving elements, each of the one or more light receiving elements receiving light and outputting a respective measurement signal representing measurements of the received light; and estimating the position and/or the orientation of the device relative to the subject based on an analysis of the respective measurement signals of the one or more light receiving elements to determine, for each of the one or more light receiving elements, (i) whether the light receiving element has received light from at least one of the one or more light emitting elements, and/or (ii) from which of the one or more light emitting elements the light receiving element has received light.

In some embodiments, the step of estimating comprises determining from the analysis of the respective measurement signals of the one or more light receiving elements which of the one or more light emitting elements and which of the one or more light receiving elements are facing the reflective surface. In these embodiments, the step of estimating may further comprise estimating the position and/or the orientation of the device relative to the subject based on which of the one or more light emitting elements and which of the one or more light receiving elements are determined to be facing the reflective surface.

In a preferred embodiment, the device comprises one single light emitting element and a plurality of light receiving elements, wherein the light emitting element and the plurality of light receiving elements are arranged on the device such that, depending on the position and/or the orientation of the device relative to the subject, at least one of the plurality of light receiving elements can receive light emitted by the light emitting element reflected by the reflective surface; wherein the step of estimating comprises determining from the respective measurement signals of the plurality of light receiving elements which of the plurality of light receiving elements has received light from the light emitting element, and estimating the position and/or the orientation of the device relative to the subject based on which of the plurality of light receiving elements has received light from the light emitting element.

In the above embodiment, a first one of the plurality of light receiving elements may be arranged on a first side of the device such that, in a first position and/or a first orientation of the device relative to the subject, said first one of the plurality of light receiving elements receives light from the light emitting element reflected by the reflective surface, and a second one of the plurality of light receiving elements may be arranged on a second side of the device, wherein the first side is different to the second side, such that, in a second position and/or a second orientation of the device relative to the subject, said second one of the plurality of light receiving elements receives light from the light emitting element reflected by the reflective surface.

In the above embodiment, said first one of the plurality of light receiving elements may be arranged on the first side of the device such that said first one of the plurality of light receiving elements does not receive light from the light emitting element when the device is in the second position and/or the second orientation relative to the subject, and said second one of the plurality of light receiving elements may be arranged on the second side of the device such that said second one of the plurality of light receiving elements does not receive light from the light emitting element when the device is in the first position and/or the first orientation relative to the subject.

In an alternative preferred embodiment, the device comprises a plurality of light emitting elements and one single light receiving element; wherein the plurality of light emitting elements and the light receiving element are arranged on the device such that, depending on the position and/or the orientation of the device relative to the subject, the light receiving element can receive light emitted by at least one of the plurality of light emitting elements and reflected by the reflective surface; wherein the step of estimating comprises determining from the measurement signal of the light receiving element which of the plurality of light emitting elements the light receiving element has received light from, and estimating the position and/or the orientation of the device relative to the subject based on which of the plurality of light emitting elements the light receiving element has received light from.

In the above embodiment, a first one of the plurality of light emitting elements may be arranged on a first side of the device such that, in a first position and/or a first orientation of the device relative to the subject, the light receiving element receives light from said first one of the plurality of light emitting elements reflected by the reflective surface, and a second one of the plurality of light emitting elements may be arranged on a second side of the device, wherein the first side is different to the second side, such that, in a second position and/or a second orientation of the device relative to the subject, the light receiving element receives light from said second one of the plurality of light emitting elements reflected by the reflective surface.

In the above embodiment, said first one of the plurality of light emitting elements can be arranged on the first side of the device such that the light receiving element does not receive light from said first one of the plurality of light emitting elements when the device is in the second position and/or the second orientation relative to the subject, and said second one of the plurality of light emitting elements can be arranged on the second side of the device such that the light receiving element does not receive light from said second one of the plurality of light emitting elements when the device is in the first position and/or the first orientation relative to the subject.

In another alternative preferred embodiment, the device comprises one single light emitting element and one single light receiving element that are arranged on the device such that, in a first position and/or a first orientation of the device relative to the subject, the light receiving element can receive light emitted by the light emitting element and reflected by the reflective surface and, in a second position and/or a second orientation of the device relative to the subject, the light receiving element cannot receive light from the light emitting element, wherein the step of estimating comprises determining from the measurement signal of the light receiving element whether the light receiving element has received light from the light emitting element, and estimating whether the device is in the first position and/or the first orientation or the second position and/or the second orientation based on whether the light receiving element has received light from the light emitting element.

In another preferred embodiment, the device comprises a plurality of light emitting elements and a plurality of light receiving elements, wherein the plurality of light emitting elements and the plurality of light receiving elements are arranged on the device such that, depending on the position and/or the orientation of the device relative to the subject, at least one of the plurality of light receiving elements can receive light emitted by at least one of the light emitting elements and reflected by the reflective surface; and the step of estimating comprises determining from the respective measurement signals of the plurality of light receiving elements which of the plurality of light receiving elements has received light from which of the plurality of light emitting elements, and estimating the position and/or the orientation of the device relative to the subject based on which of the plurality of light receiving elements has received light from which of the plurality of light emitting elements.

In some embodiments, the method further comprises the step of analysing each respective measurement signal of the one or more light receiving elements to determine whether at least one of the one or more light receiving elements has received light from an external light source in the environment of the subject; and the step of estimating comprises estimating the position and/or the orientation of the device relative to the subject based on whether at least one of the one or more light receiving elements has received light from the external light source.

In some embodiments, the one or more light receiving elements are each configured to output a respective measurement signal representing measurements of the received light and indicating a direction from which the received light has been received, and the method further comprises the step of analysing each respective measurement signal of the one or more light receiving elements to determine whether at least one of the one or more light receiving elements has received light from an external light source in the environment of the subject and to determine the direction of the external light source relative to the device; wherein the step of estimating comprises estimating the position and/or the orientation of the device relative to the subject based on whether at least one of the one or more light receiving elements has received light from the external light source and the direction of said external light source relative to the device.

In some embodiments, the method further comprises the step of measuring the orientation of the device using one or more sensors.

In some embodiments, the method further comprises the step of performing a personal care activity on the subject using a personal care component. In these embodiments, the method can further comprise the step of adjusting one or more operating parameters of the personal care component based on the estimated position and/or the estimated orientation of the device relative to the subject.

In some embodiments, the step of emitting light comprises emitting light from each of the one or more light emitting element having a different wavelength, modulation and/or polarisation as compared to the light emitted by each other of the one or more light emitting elements.

According to a further aspect of the invention, there is provided a handheld personal care device, the device comprising a light emitting element configured to emit light; a plurality of light receiving elements, each configured to receive light and to output a respective measurement signal representing measurements of the received light; wherein the light emitting element and the plurality of light receiving elements are arranged on the device such that, depending on the position and/or the orientation of the device relative to the subject, at least one of the plurality of light receiving elements can receive light emitted by the light emitting element and reflected by a reflective surface in an environment of the subject; and a control unit configured to determine from the respective measurement signals of the plurality of light receiving elements which of the plurality of light receiving elements has received light from the light emitting element, and to estimate the position and/or the orientation of the device relative to the subject based on which of the plurality of light receiving elements has received light from the light emitting element.

In some embodiments, a first one of the plurality of light receiving elements is arranged on a first side of the device such that, in a first position and/or a first orientation of the device relative to the subject, said first one of the plurality of light receiving elements receives light from the light emitting element reflected by the reflective surface, and a second one of the plurality light receiving elements is arranged on a second side of the device, wherein the first side is different (e.g. opposite) to the second side, such that, in a second position and/or a second orientation of the device relative to the subject (e.g. opposite the first position and/or the first orientation), said second one of the plurality of light receiving elements receives light from the light emitting element reflected by the reflective surface.

In some embodiments, said first one of the plurality of light receiving elements is arranged on the first side of the device such that said first one of the plurality of light receiving element does not receive light from the light emitting element when the device is in the second position and/or the second orientation relative to the subject, and said second one of the plurality of light receiving elements is arranged on the second side of the device such that said second one of the plurality of light receiving elements does not receive light from the light emitting element when the device is in the first position and/or the first orientation relative to the subject.

According to yet another aspect of the invention, there is provided a handheld personal care device that comprises a plurality of light emitting elements, each configured to emit light; a light receiving element configured to receive light and to output a measurement signal representing measurements of the received light; wherein the plurality of light emitting elements and the light receiving element are arranged on the device such that, depending on the position and/or the orientation of the device relative to the subject, the light receiving element receives light emitted by at least one of the plurality of light emitting elements and reflected by a reflective surface in an environment of the subject; and a control unit configured to determine from the measurement signal of the light receiving element which of the plurality of light emitting elements the light receiving element has received light from, and to estimate the position and/or the orientation of the device relative to the subject based on which of the plurality of light emitting elements the light receiving element has received light from.

In some embodiments, a first one of the plurality of light emitting elements is arranged on a first side of the device such that, in a first position and/or a first orientation of the device relative to the subject, the light receiving element receives light from said first one of the plurality of light emitting elements reflected by the reflective surface, and a second one of the plurality of light emitting elements is arranged on a second side of the device, wherein the first side is different (e.g. opposite) to the second side, such that, in a second position and/or a second orientation of the device relative to the subject (e.g. opposite the first position and/or the first orientation), the light receiving element receives light from said second one of the plurality of light emitting elements reflected by the reflective surface.

In some embodiments, said first one of the plurality of light emitting elements is arranged on the first side of the device such that the light receiving element does not receive light from said first one of the plurality of light emitting elements when the device is in the second position and/or the second orientation relative to the subject, and said second one of the plurality of light emitting elements is arranged on the second side of the device such that the light receiving element does not receive light from said second one of the plurality of light emitting elements when the device is in the first position and/or the first orientation.

According to yet another aspect of the invention, there is provided a handheld personal care device, comprising a light emitting element configured to emit light; a light receiving element configured to receive light and to output a measurement signal representing measurements of the received light; wherein the light emitting element and the light receiving element are arranged on the device such that, in a first position and/or a first orientation of the device relative to a subject, the light receiving element receives light emitted by the light emitting element and reflected by a reflective surface in an environment of the subject and, in a second position and/or a second orientation of the device relative to the subject, the light receiving element does not receive light emitted by the light emitting element; and wherein the device comprises a control unit configured to determine from the measurement signal of the light receiving element whether the light receiving element has received light from the light emitting element, and to estimate whether the device is in the first position and/or the first orientation relative to the subject or the second position and/or the second orientation relative to the subject based on whether the light receiving element has received light from the light emitting element.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
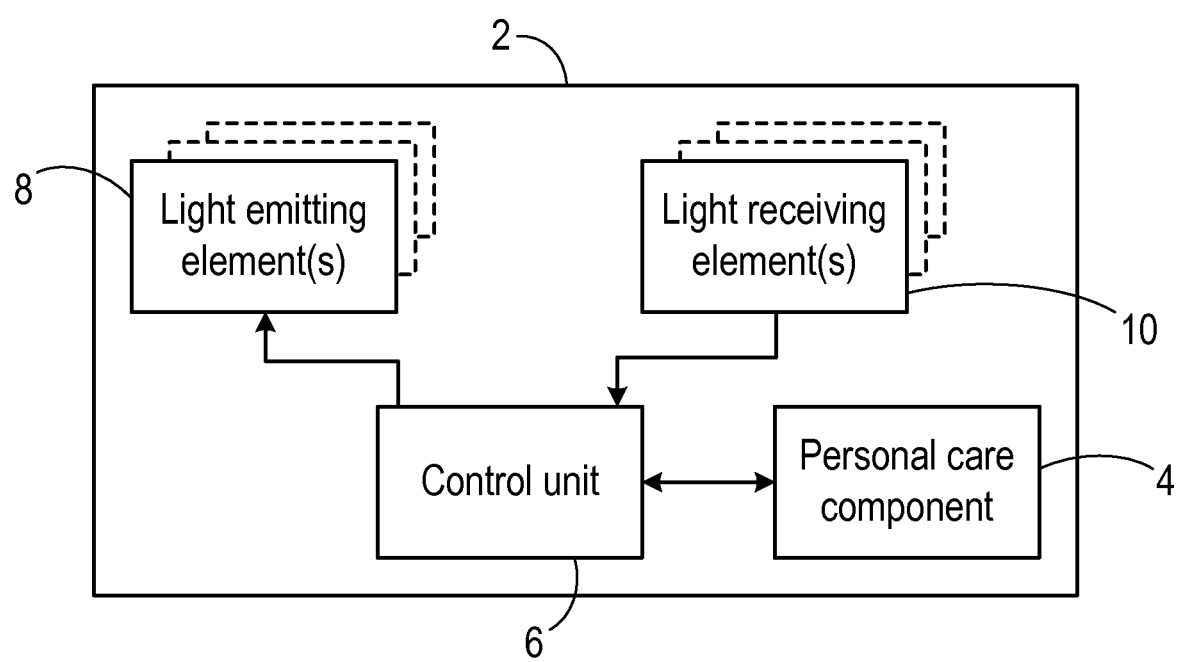
FIG. 1 is a block diagram of a handheld personal care device according to the invention.

The position and/or the orientation of a handheld personal care device, such as a shaver or toothbrush, relative to a subject changes as the handheld personal care device is used by the subject. For example, a shaver can be in a first orientation and position when the handheld personal care device is being used on the left side of the subject's face and in a second orientation and position when the handheld personal care device is being used on the right side of the subject's face. In addition, many handheld personal care devices, such as shavers and toothbrushes, are used by the subject while they are standing in front of a mirror.

The techniques presented in this document for estimating the position and/or the orientation of a handheld personal care device relative to a subject make use of knowledge of typical orientations and/or positions of a handheld personal care device during use by the subject (including knowledge of how a handheld personal care device is held by the user or subject), and also make use of the fact that the body part being treated is typically in front of a mirror so that the subject or user can view the treatment area (i.e. the area or part of the body that the handheld personal care device is being used on), or more generally themselves, while using the handheld personal care device.

In particular, it has been found that it is possible to provide an estimate of the position and/or the orientation of a handheld personal care device relative to the subject by providing the handheld personal care device with one or more light emitting elements and one or more light receiving elements, and arranging the one or more light emitting elements and the one or more light receiving elements on the handheld personal care device such that at least one of the one or more light receiving elements is able to receive light from at least one of the one or more light emitting elements after reflection of said light by a mirror in the environment of the handheld personal care device, depending on the orientation and/or the position of the handheld personal care device relative to the subject. Thus, based on whether and/or which of the one or more light receiving elements receives light emitted by which of the one or more light emitting elements after reflection of said light by the mirror, it is possible to estimate the position and/or the orientation of the handheld personal care device relative to the subject. It will be appreciated that the estimate determined according to the techniques described herein is not an estimate of an absolute position (i.e. a position measured in an external reference frame, such as the Earth's frame of reference), but merely an estimate of where the handheld personal care device is relative to the subject. As described in more detail below, this estimate may be an estimate of which side of the body the handheld personal care device is being used on, rather than an estimate of the distance between the handheld personal care device and the subject.

The term "subject" is used throughout this document to refer to the person (or animal) on which the handheld personal care device is being used. For example the subject is the person whose teeth are being brushed or whose face is being shaved. The "subject" is also the person (or animal) to which the relative position and/or orientation of the handheld personal care device is estimated. The term "user" refers to the person that is using or controlling the handheld personal care device and is typically the subject (i.e. the "subject" is operating and using the handheld personal care device on themselves). However in some situations the "user" may be a different person to the subject. For example a user may use the handheld personal care device on another person (the "subject"), such as brushing their teeth or shaving their face. In the embodiments described below, it is assumed that the subject is using the handheld personal care device on themselves, but it should be appreciated that the embodiments are also applicable to situations where the handheld personal care device is used by a user to perform the personal care activity on the subject.

FIG. 1 is a block diagram of a handheld personal care device 2 (which is also referred to herein as a 'device') according to the invention. The handheld personal care device 2 is for use in performing a personal care activity on or to the user of the handheld personal care device 2. The handheld personal care device 2 can be for use on a specific part of the body, e.g. the teeth or the face, or it could be for use generally on the body, e.g. it could be for shaving or cutting hair on the face, legs, arms, etc.

The handheld personal care device 2 can be any type of device that is held in the hand and that is for performing any type of personal care activity. For example, and without limitation, the handheld personal care device 2 can be any of an electric shaver, a handheld razor (i.e. without any moving or actuated parts), hair clippers, a beard trimmer, a manual toothbrush (i.e. without any moving or actuated parts), an electric toothbrush, an 'air floss' device, a skin massager, a skin treatment applicator, a facial cleanser, an eye energiser, an epilator, etc.

The handheld personal care device 2 includes a personal care component 4 that is for performing a personal care activity on a subject, or is for use in performing a personal care activity on a subject. The nature or type of personal care component 4 depends on the nature or type of the handheld personal care device 2. For example where the handheld personal care device 2 is an electric shaver, the personal care component 4 can comprise a shaving head, including one or more blades or other cutting element(s), and an actuator (for example a motor) for actuating the cutting element to create a cutting action. In another example, where the handheld personal care device 2 is an electric toothbrush, the personal care component 4 can comprise a brush head and an actuator for actuating the brush head (e.g. rotating, oscillating and/or vibrating the brush head) to create a brushing action. In yet another example, the handheld personal care device 2 is a manual toothbrush, and the personal care component 4 is a static brush head. It will be appreciated from the following description of the invention that the invention can be implemented or used with any type of personal care component 4, and the examples provided above should not be considered to be limiting.

It will be appreciated that in some embodiments the personal care component 4 can comprise one or more elements, such as an actuator, whose operating parameter(s) can vary or be varied during use of the handheld personal care device 2. For example a direction and/or speed of rotation of an actuator can be changed during use, or a cutting length of a cutting element can be changed during use, etc. In these embodiments, the personal care component 4 can receive a control signal or control signals that set or control the operating parameter(s) of the personal care component 4.

The handheld personal care device 2 also includes a control unit 6 that is configured to perform the method according to the invention to estimate the position and/or the orientation of the handheld personal care device 2 relative to the subject, and, in some embodiments, to control the operation of the personal care component 4 based on the estimated position and/or the orientation of the handheld personal care device 2 relative to the subject by sending one or more control signals to the personal care component 4. In some embodiments the control unit 6 is part of the same unit as the personal care component 4, but in other embodiments the control unit 6 is in a separate unit to the personal care component 4. For example the handheld personal care device 2 can comprise or have an associated base unit (e.g. a docking and/or charging station for the handheld personal care device 2) and the control unit 6 can be part of that base unit. In the embodiments where the control unit 6 is in a separate unit to the personal care component 4, that unit may comprise a respective control unit and/or other circuitry (e.g. transceiver circuitry) that can be configured to exchange control signals and/or other information or data with the control unit 6 and to control the operation of the personal care component 4 accordingly.

The control unit 6 can be implemented in numerous ways, with software and/or hardware, to perform the various functions described below. The control unit 6 may comprise one or more microprocessors or digital signal processor (DSPs) that may be programmed using software or computer program code to perform the required functions and/or to control components of the control unit 6 to effect the required functions. The control unit 6 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

In various implementations, the control unit 6 may be associated with or comprise one or more memory units (not shown in FIG. 1) such as volatile and non-volatile computer memory such as RAM, PROM, EPROM, and EEPROM. The control unit 6 or associated memory unit can also be used for storing program code that can be executed by a processor in the control unit 6 to perform the method described herein.

As noted above, the position and/or the orientation estimation of the handheld personal care device 2 relative to the subject according to the invention is achieved by providing the handheld personal care device 2 with one or more light emitting elements and one or more light receiving elements. Thus, the handheld personal care device 2 comprises one or more light emitting elements 8 and one or more light receiving elements 10. The light receiving elements 10 each output a measurement signal representing measurements of the received light, and this measurement signal is provided to the control unit 6 for processing or analysis.

Thus, in some embodiments there is one single light emitting element 8 and one single light receiving element 10. In other embodiments, there is one single light emitting element 8 and a plurality of light receiving elements 10. In other embodiments, there is a plurality of light emitting elements 8 and one single light receiving element 10.

The light emitting element 8 can be any suitable element that emits light. For example each light emitting element 8 can be or comprise one or more light emitting diodes, LEDs, although it will be appreciated that other types of light emitting element can be used, such as laser diodes, vertical-cavity surface-emitting lasers (VCSELs), etc. Each light emitting element 8 can comprise a single light source (e.g. a single LED) or an arrangement or array of multiple light sources (e.g. a strip of LEDs). Each light emitting element 8 can emit light at a specific wavelength (e.g. colour) or in a specific range of wavelengths. The emitted light can be at a wavelength that is in the part of the spectrum visible to people (e.g. light of a particular colour), or in parts that are not visible (e.g. infrared, IR). Where the handheld personal care device 2 comprises a plurality of light emitting elements 8, each light emitting element 8 can emit light in a manner that enables the specific light emitting element 8 to be identified. In some embodiments, each light emitting element 8 can emit light at a respective wavelength (e.g. at a respective colour). In other embodiments, each light emitting element 8 can be controlled to emit modulated and/or polarised light, with each light emitting element 8 using a respective modulation and/or polarisation. For example in the case of a handheld personal care device 2 that comprises three light emitting elements 8, the light emitting elements 8 may emit red, green and blue light respectively. Alternatively the light emitting elements 8 may emit three different wavelengths of light at a particular colour, for example three shades of blue light. Alternatively the light emitting elements 8 can emit IR light at three respective IR wavelengths.

The light emitting element(s) 8 are arranged on the handheld personal care device 2 to emit light away from the handheld personal care device 2. In some embodiments, the light emitting element(s) 8 emit light in all directions away from the handheld personal care device 2. In alternative embodiments, the light emitting element(s) 8 are directional in the sense that they each emit light in a particular direction and so do not emit light in all directions away from the device 2. For example each light emitting element 8 can have a reflector or other arrangement for directing or focusing light from a source in a particular direction. In some embodiments, the direction with which a light emitting element 8 emits light can be controlled by the control unit 6, for example by physically adjusting the orientation of the light emitting element 8 in the handheld personal care device 2 or by adjusting the reflector or other arrangement.

In some embodiments, the light emitting element(s) 8 emit light continuously. In other embodiments, the light emitting elements 8 emit pulses of light according to a predetermined or configurable pulse cycle (also known as duty cycle), and/or the emitted light could be modulated and/or polarised. As noted above, in some embodiments the modulation and/or polarisation of the light can be different for each of the light emitting elements 8 to enable the source of the light to be identified by the light receiving element(s) 10.

The light receiving element(s) 10 can be any suitable element that receives light and outputs a measurement signal representing the measurements of the received light. For example each light receiving element 10 can be or comprise one or more photodetectors, such as photodiodes, although it will be appreciated that other types of light receiving element can be used. For example, each light receiving element 10 can comprise an image sensor, such as a charge coupled device (CCD) sensor, a complementary metal-oxide-semiconductor (CMOS) sensor or an N-type metal-oxide-semiconductor (NMOS) sensor as used in digital cameras.

Each light receiving element 10 can be sensitive to (i.e. can sense or measure) light at a specific wavelength (e.g. colour) or a specific range of wavelengths. The light receiving elements 10 can be sensitive to light at a wavelength in the visible part of the spectrum (e.g. light of a particular colour) or in other parts of the spectrum, such as IR.

It will be appreciated that each of the one or more light receiving elements 10 will be sensitive to the light emitted by at least one of the one or more light emitting elements 8.

Where the handheld personal care device 2 comprises a plurality of light emitting elements 8, with each light emitting element 8 emitting light at a respective wavelength, the handheld personal care device 2 may comprise a single light receiving element 10 that is sensitive to the wavelength of light from each of the plurality of light emitting elements 8. Alternatively the handheld personal care device 2 can comprise multiple light receiving elements 10 that are each sensitive to the light from one or more (or all) of the plurality of light emitting elements 8.

Where the handheld personal care device 2 comprises a single light emitting element 8, the handheld personal care device 2 can comprise a single light receiving element 10 that is sensitive to the light from the light emitting element 8. Alternatively, the handheld personal care device 2 can comprise multiple light receiving elements 10 that are each sensitive to the light from the single light emitting element 8.

In some cases each light receiving element 10 can comprise multiple sensing elements (e.g. multiple photodiodes) that are each sensitive to a respective wavelength or wavelengths of light, and that each generate an output representing the measurements of the light at the relevant wavelength or wavelengths.

The one or more light receiving elements 10 are arranged on the handheld personal care device 2 to receive light that is incident on the handheld personal care device 2. In some embodiments, the one or more light receiving elements 10 receive (and measure) light from all directions (external to the handheld personal care device 2). In alternative embodiments, the one or more light receiving elements 10 are directional in the sense that they each receive light from a particular direction and so are not sensitive to (or are much less sensitive to) light from other directions. In some embodiments, the direction from which a light receiving element 10 receives light can be controlled by the control unit 6, for example by physically adjusting the orientation of the light receiving element 10 in the handheld personal care device 2. In some embodiments, the one or more light receiving elements 10 are sensitive to light from all directions, but each provide a measurement signal indicating the direction from which specific light signals have been received. In some embodiments, each light receiving element 10 can comprise a plurality of segments or regions that can measure light incident from respective directions. This type of light receiving element 10 is similar to that used in devices that track the position of the sun in the sky.

As noted above, the one or more light emitting elements 8 and the one or more light receiving elements 10 are arranged on the device 2 such that, depending on the position and/or the orientation of the device 2 relative to the subject, at least one of the one or more light receiving elements 10 can receive light emitted by at least one of the one or more light emitting elements 8 after reflection of said light by a reflective surface, such as a mirror.

Preferably, the light emitting element(s) 8 and light receiving element(s) 10 are arranged such that there is no direct line of sight from any light emitting element 8 to any light receiving element 10. This is to allow only the reflected light to be used to estimate the position and/or the orientation of the device 2 relative to the subject, and to prevent light 'leaking' from the light emitting element(s) 8 directly to the light receiving element(s) 10. Any suitable arrangement can be used for this purpose (e.g. by putting the light emitting element(s) 8 and the light receiving element(s) 10 on different faces or surfaces of the device 2, or by providing some structure between the light emitting element(s) 8 and light receiving element(s) 10 to prevent there being any direct lines of sight therebetween. In some embodiments, the light emitting element(s) 8 and light receiving element(s) 10 can be arranged at opposite ends of the device 2.

It will be appreciated from the explanation of the invention below that the number of light emitting elements 8 and light receiving elements 10 determines the 'resolution' with which the position and/or the orientation of the device 2 relative to the subject can be estimated. For example, in the case of a single light emitting element 8 and a single light receiving element 10, it is possible to distinguish between two broad positions and/or orientations of the device 2 relative to the subject (for example on the left-hand side of the subject or the right-hand side of the subject). In the case of a single light emitting element 8 and, say, three light receiving elements 10, it is possible to distinguish between three or four different positions and/or orientations of the device 2 relative to the subject (e.g. on the left-hand side of the face, the right-hand side of the face, in the middle of the face, and close to the neck).

It will also be appreciated that the handheld personal care device 2 generally comprises a housing or body that defines a handle portion that is to be held by the user during use of the device 2. Typically (although not always), the device 2 can be generally elongate in shape, with the handle portion at one end of the device 2, and the personal care component 4 at the opposite end. It will be appreciated that the handle portion can be shaped and/or contoured to encourage the user to hold the device 2 in a consistent and expected manner during use.

Some exemplary arrangements of the light emitting elements 8 and light receiving elements 10 are described below with reference to FIGS. 2-6.

It will be appreciated that the components and features of the handheld personal care device 2 shown in FIG. 1 are not exhaustive, and an actual implementation of a handheld personal care device 2 will include further components and features to those shown and described above. For example the handheld personal care device 2 may include a power supply, such as a battery, or means for connecting the handheld personal care device 2 to a power supply. Alternatively or in addition, the handheld personal care device 2 may comprise one or more buttons, controls, or other user interface elements to allow a user to control the operation of the device 2. In addition, the handheld personal care device 2 may include transceiver circuitry and/or other communication means to enable components of the device 2 to communicate with each other (for example where the control unit 6 and personal care component 4 are not located in the same unit/housing, and/or where the control unit 6 is not located in the same unit as the light emitting element(s) 8 and light receiving element(s) 10). The transceiver circuitry can be any suitable wireless module, including, for example, radio or infra-red transmitters and receivers. Suitable wireless technologies include Bluetooth, Zigbee, Wi-Fi, etc. Transceiver circuitry can also or alternatively be provided where the handheld personal care device 2 is to provide information on the usage and/or operation of the device 2 to another system, for example operated by the manufacturer of the device 2, so that the manufacturer can monitor how consumers are using their devices, and/or to another electronic device belonging to the subject or user (such as a computer, smart phone, tablet, etc.) so that the user or subject can review and/or monitor their usage of the device 2.

Figure 2:
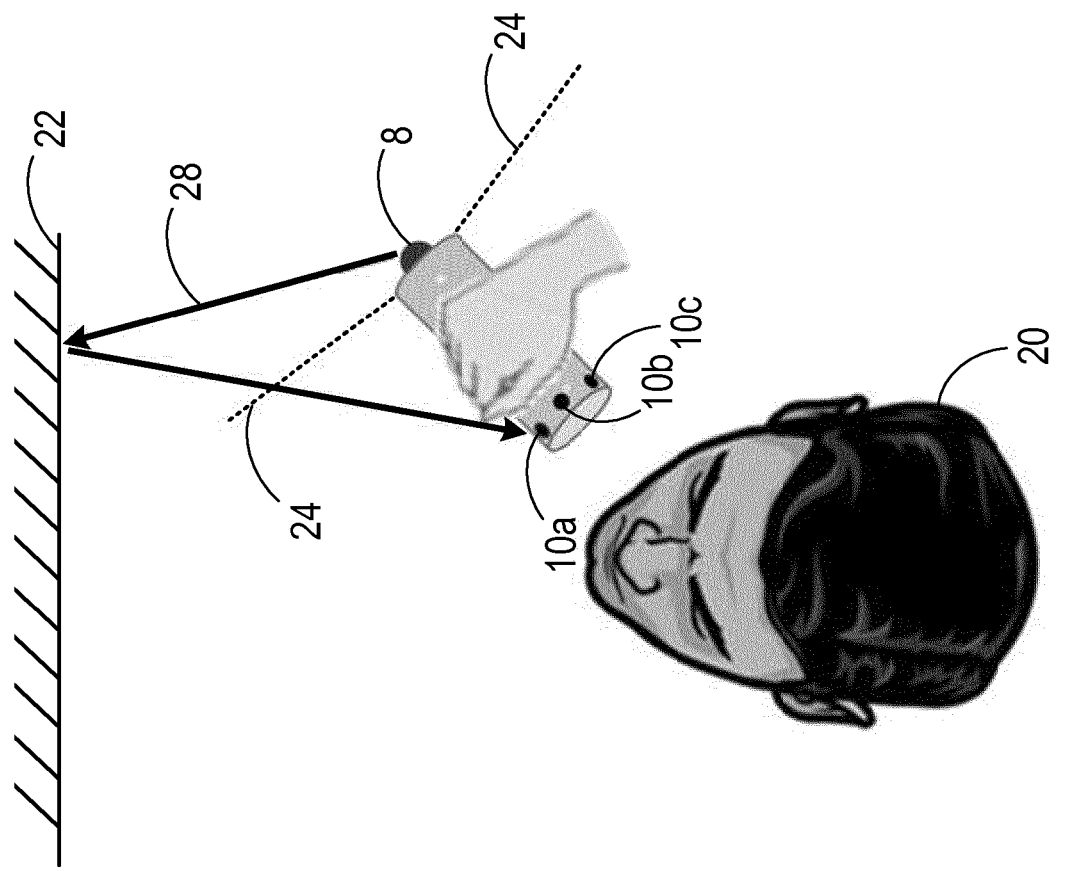
FIG. 2 illustrates a first specific embodiment of a handheld personal care device according to the invention positioned on the left side of a subject's face (FIG. 2(a)) and positioned on the right side of the subject's face (FIG. 2(b))
Figure 2:
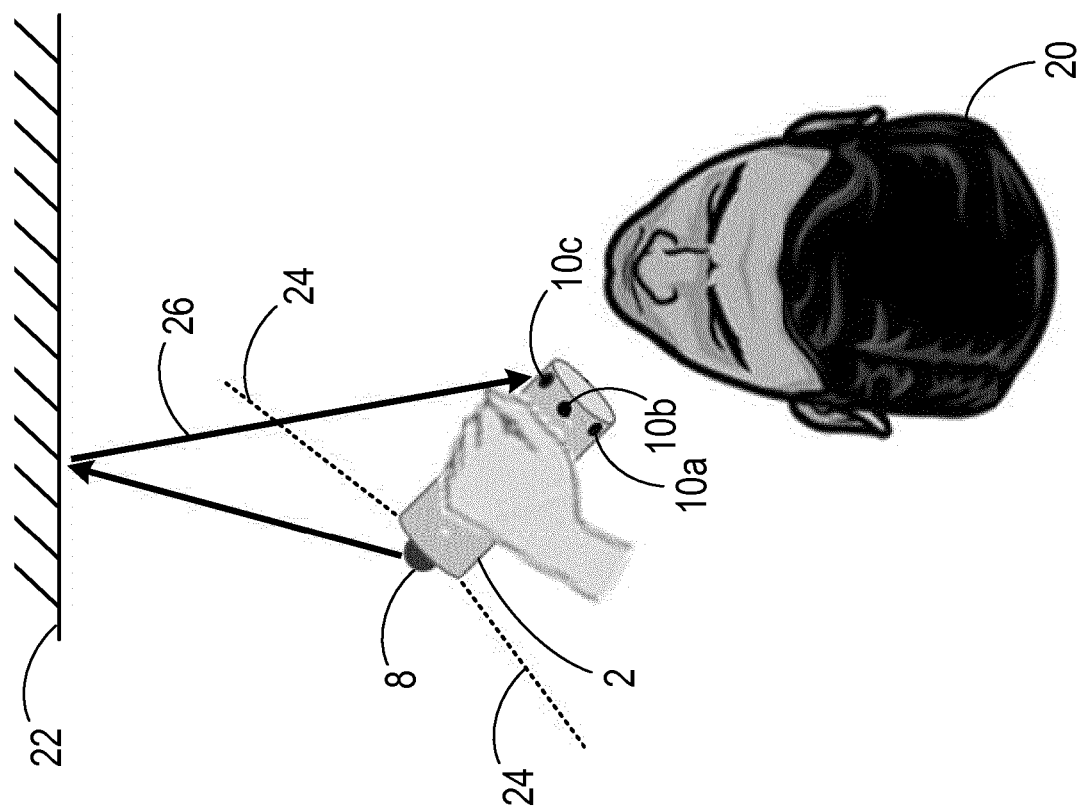

FIG. 2 shows a first specific embodiment of a handheld personal care device 2 according to the invention positioned on different sides of the face of a subject 20. The subject 20 is using the device 2 on the face while the subject 20 is in front of a mirror 22 or other reflective surface. It will also be appreciated that the phrase 'in front of' the reflective surface means that the subject 20 is positioned relative to the reflective surface 22 so that the subject 20 can see the reflection in the reflective surface 22.

In the embodiment shown in FIG. 2, the handheld personal care device 2 comprises a single light emitting element 8 arranged near or at an end of the device 2, with a plurality of light receiving elements 10a, 10b, 10c (in this case three) arranged near or at an opposite end of the device 2. The light receiving elements comprise a first light receiving element 10a, a second light receiving element 10b and a third light receiving element 10c. The light emitting element 8 emits light generally in all directions away from the device 2, as shown by dotted lines 24. The three light receiving elements 10a, 10b, 10c are each sensitive to at least the light emitted by the light emitting element 8. The three light receiving elements 10a, 10b, 10c are arranged such that the orientation and position of the device 2 relative to the subject 20 affects which one or ones of the three light receiving elements 10a, 10b, 10c receive(s) light from the light emitting element 8 via the reflective surface 22.

Thus, in FIG. 2(a), the device 2 is located or positioned on the left-hand side of the subject's face 20, and the arrangement of the light receiving elements 10a, 10b, 10c means that the light emitted by the light emitting element 8 and reflected by the reflective surface 22 is only received by the third light receiving element 10c, as indicated by light beam 26. Light from the light emitting element 8 is not received by the first light receiving element 10a or second light receiving element 10b.

The control unit 6 receives the measurement signal from each of the three light receiving elements 10a, 10b, 10c and analyses the measurement signals to determine which of the light receiving elements 10a, 10b, 10c has received light from the light emitting element 8. Those skilled in the art will be aware of various techniques that can be used to determine which of the light receiving elements 10 has received light from the light emitting element 8. For example, the measurement signal from each light receiving element 10a, 10b, 10c can be processed using modulation and/or frequency analysis to determine if that light receiving element 10a, 10b, 10c has received light from the light emitting element 8 (which can have a specific modulation, and/or a specific frequency/wavelength). Thus, the control unit 6 will determine that the third light receiving element 10c has received light from the light emitting element 8 (and also that the first light receiving element 10a and second light receiving element 10b have not received light from the light emitting element 8), and so the control unit 6 can determine that the third light receiving element 10c is facing the reflective surface 22. Based on the expected manner in which the device 2 is to be held by the user 20 (i.e. that the third light receiving element 10c will face the reflective surface 22 when the device 2 is on the left side of the subject's face 20), the control unit 6 can estimate that the device 2 is positioned on the left side of the subject's face 20.

In FIG. 2(b), the device 2 is located or positioned on the right-hand side of the subject's face 20, and it can be seen that the device 2 is in a different orientation relative to the reflective surface 22 than in FIG. 2(a). The arrangement of the light receiving elements 10a, 10b, 10c means that the light emitted by the light emitting element 8 that is reflected by the reflective surface 22 is now only received by the first light receiving element 10a, as indicated by light beam 28. Light from the light emitting element 8 is not received by the second light receiving element 10b or third light receiving element 10c, since the second light receiving element 10b and the third light receiving element 10c are now generally facing away from the reflective surface 22.

The control unit 6 receives the measurement signal from each of the three light receiving elements 10a, 10b, 10c and analyses the signals to determine which of the light receiving elements 10a, 10b, 10c has received light from the light emitting element 8 as described above. Thus, the control unit 6 will determine that the first light receiving element 10a has received light from the light emitting element 8 (and also that the second light receiving element 10b and third light receiving element 10c have not received light from the light emitting element 8), and so the control unit 6 can determine that the first light receiving element 10a is facing the reflective surface 22. Based on the expected manner in which the device 2 is to be held by the user 20 (i.e. that the first light receiving element 10a will face the reflective surface 22 when the device 2 is on the right side of the subject's face 20), the control unit 6 can estimate that the device 2 is positioned on the right side of the subject's face 20.

It will be appreciated that the relationship between the light receiving elements 10a, 10b, 10c and the position of the device 2 relative to the subject 20 can be preconfigured in the device 2. In addition, or alternatively, the subject 20 can perform a calibration procedure in which the subject 20 moves the device 2 into predetermined positions so that the control unit 6 can determine which light receiving element (s) 10a, 10b, 10c face(s) the reflective surface 22 in certain positions and/or orientations of the device 2 relative to the subject 20. This calibration procedure can therefore compensate or account for differences or variations in the way that different subjects 20 hold the device 2 during use.

Figure 3:
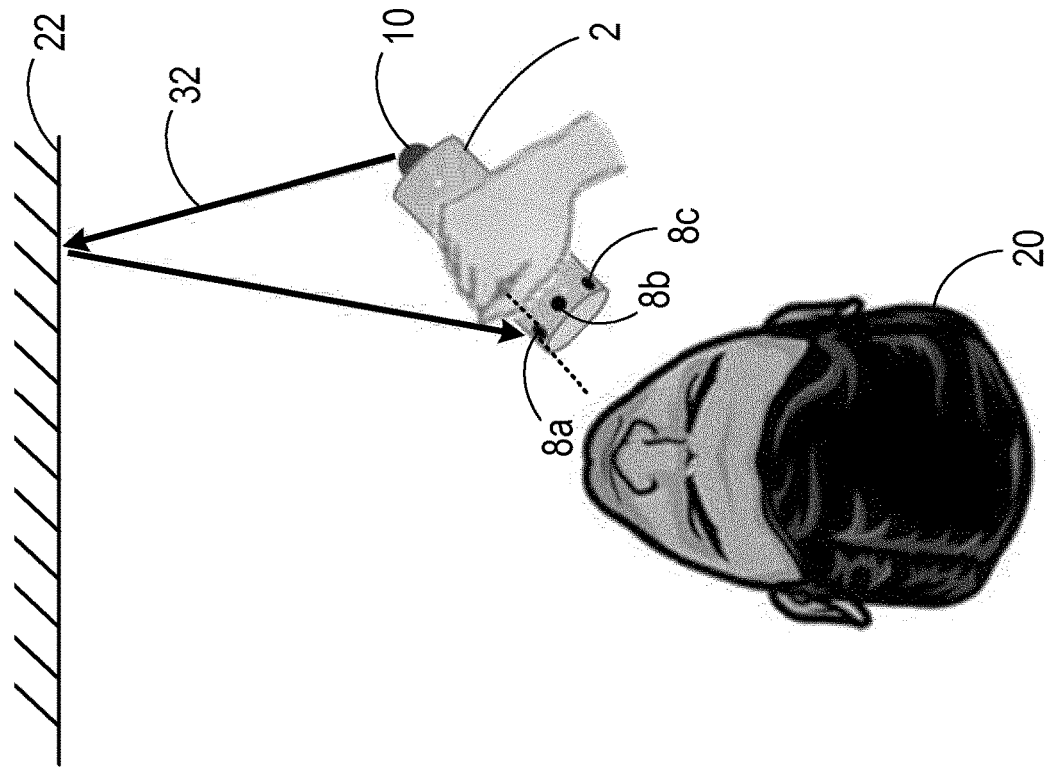
FIG. 3 illustrates a second specific embodiment of a handheld personal care device according to the invention positioned on the left side of a subject's face (FIG. 3(a)) and positioned on the right side of the subject's face (FIG. 3(b))
Figure 3:
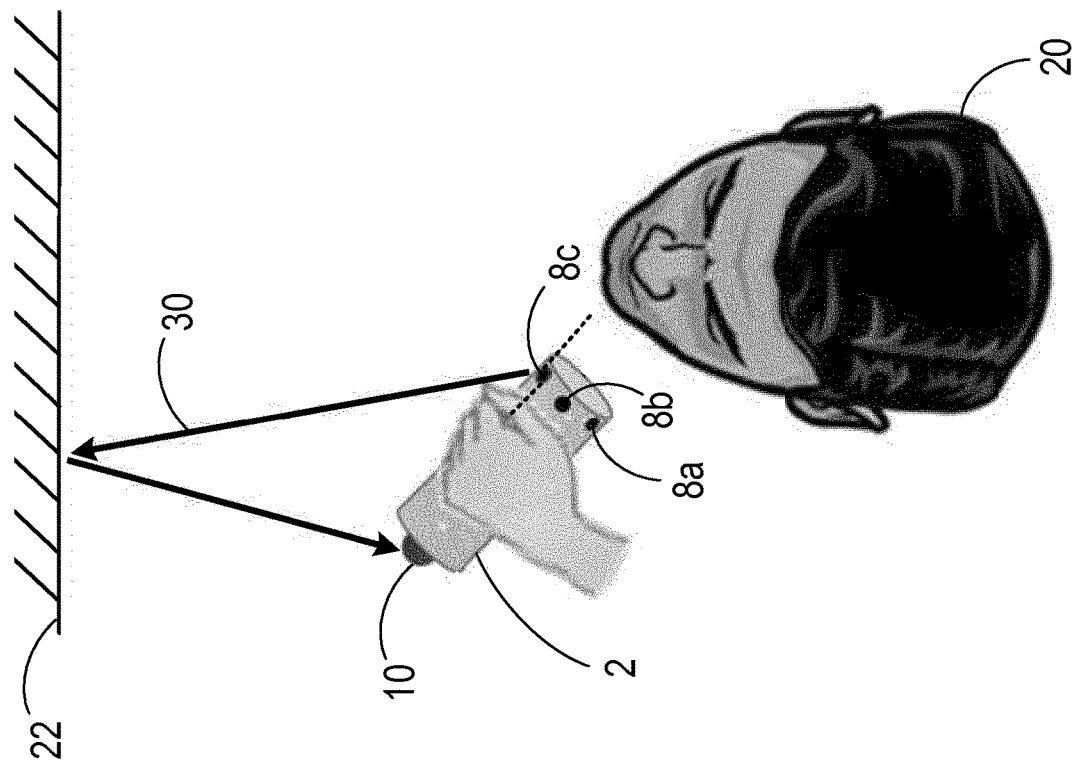

FIG. 3 shows a second specific embodiment of a handheld personal care device 2 according to the invention positioned on different sides of the face of a subject 20. As in the embodiment shown in FIG. 2, the subject 20 is using the device 2 on the face while the subject 20 is in front of a mirror 22, or other reflective surface.

In the embodiment shown in FIG. 3, the handheld personal care device 2 comprises a plurality of light emitting elements 8a, 8b, 8c (in this case three) arranged near or at an end of the device 2, with a single light receiving element 10 arranged near or at an opposite end of the device 2. The light emitting elements comprise a first light emitting element 8a, a second light emitting element 8b and a third light emitting element 8c. Each light emitting element 8a, 8b, 8c emits light generally in all directions away from the device 2, however each light emitting element 8a, 8b, 8c emits light at a different wavelength (frequency). For example the first light emitting element 8a can emit red light, the second light emitting element 8b can emit green light and the third light emitting element 8c can emit blue light. In alternative embodiments, the light emitting elements 8a, 8b, 8c can emit three different wavelengths of IR light, or three different 'shades' of light at a particular colour (e.g. red). The light receiving element 10 is sensitive to at least the wavelengths of light emitted by the three light emitting elements 8a, 8b, 8c. The three light emitting elements 8a, 8b, 8c are arranged such that the orientation and position of the device 2 relative to the subject 20 affects which one or ones of the light emitting elements 8a, 8b, 8c the light receiving element 10 receives light from via the reflective surface 22.

Thus, in FIG. 3(a), the device 2 is located or positioned on the left-hand side of the subject's face 20, and the arrangement of the light emitting elements 8a, 8b, 8c means that the light emitted by the third light emitting element 8c (e.g. that is emitting blue light) is reflected by the reflective surface 22 and received by the light receiving element 10, as indicated by light beam 30. Light from the first light emitting element 8a and the second light emitting element 8b is not received by the light receiving element 10 as the light is not reflected by the reflective surface 22.

The control unit 6 receives the measurement signal from the light receiving element 10 and analyses the signal to determine which of the light emitting elements 8a, 8b, 8c the light receiving element 10 has received light from. Those skilled in the art will be aware of various techniques that can be used to determine which of the light emitting elements 8a, 8b, 8c the light receiving element 10 has received light from. For example, the measurement signal from the light receiving element 10 can be processed using wavelength-related intensity modulation and/or frequency analysis to determine the frequencies of light that have been received (since each light emitting element 8a, 8b, 8c can have a specific modulation, and/or a specific frequency/wavelength). Thus, the control unit 6 will determine that the light receiving element 10 has received light from the third light emitting element 8c (and also that the light receiving element 10 has not received light from the first light emitting element 8a or second light emitting element 8b), and so the control unit 6 can determine that the third light emitting element 8c is facing the reflective surface 22. Based on the expected manner in which the device 2 is to be held by the user 20 (i.e. that the third light emitting element 8c will face the reflective surface 22 when the device 2 is on the left side of the subject's face 20), the control unit 6 can estimate that the device 2 is positioned on the left side of the subject's face 20.

In FIG. 3(b), the device 2 is located or positioned on the right-hand side of the subject's face 20, and it can be seen that the device 2 is in a different orientation relative to the reflective surface 22 than in FIG. 3(a). The arrangement of the light emitting elements 8a, 8b, 8c means that only the light emitted by the first light emitting element 8a is reflected by the reflective surface 22 and received by the light receiving element 10, as indicated by light beam 32. Light from the second light emitting element 8b and light from the third light emitting element 8c is not received by the light receiving element 10, since the second light emitting element 8b and the third light emitting element 8c are now generally facing away from the reflective surface 22.

The control unit 6 receives the measurement signal from the light receiving element 10 and analyses the signal to determine which of the light emitting elements 8a, 8b, 8c the light receiving element 10 has received light from as described above. Thus, the control unit 6 will determine that the light receiving element 10 has received light from the first light emitting element 8a (and also that the light receiving element 10 has not received light from the second light emitting element 8b or the third light emitting element 8c), and so the control unit 6 can determine that the first light emitting element 8a is facing the reflective surface 22. Based on the expected manner in which the device 2 is to be held by the user 20 (i.e. that the first light emitting element 8a will face the reflective surface 22 when the device 2 is on the right side of the subject's face 20), the control unit 6 can estimate that the device 2 is positioned on the right side of the subject's face 20.

It will be appreciated that the relationship between the light emitting elements 8a, 8b, 8c and the position of the device 2 relative to the subject 20 can be preconfigured in the device 2. In addition, or alternatively, the subject 20 can perform a calibration procedure in which the subject 20 moves the device 2 into predetermined positions so that the control unit 6 can determine which light emitting element(s) 8a, 8b, 8c face(s) the reflective surface 22 in certain positions and/or orientations of the device 2 relative to the subject 20. This calibration procedure can therefore compensate or account for differences or variations in the way that different subjects 20 hold the device 2 during use.

In embodiments where the device 2 comprises a single light emitting element 8 and a single light receiving element 10, it will be appreciated that the light emitting element 8 and the light receiving element 10 will be arranged in the device 2 such that the light receiving element 10 can receive light from the light emitting element 8 after reflection of said light by the reflective surface 22 when the device 2 is in one position and/or orientation relative to the subject 20, but cannot receive light from the light emitting element 8 when the device 2 is in a second position and/or orientation relative to the subject 20.

For example, the device 2 could comprise a single light receiving element 10 in the position corresponding to the third light receiving element 10c shown in FIG. 2 (and no other light receiving elements). So, when the device 2 is on the left side of the subject's face 20, the light receiving element 10 will receive light from the light emitting element 8. This allows the control unit 6 to estimate that the device 2 is on the left side of the subject 20 when the light receiving element 10 receives light from the light emitting element 8. If the control unit 6 determines that the light receiving element 10 does not receive light from the light emitting element 8 (e.g. the light receiving element 10 is now facing away from the reflective surface 22), then it can estimate that the device 2 is on the right side of the subject 20.

Figure 4:
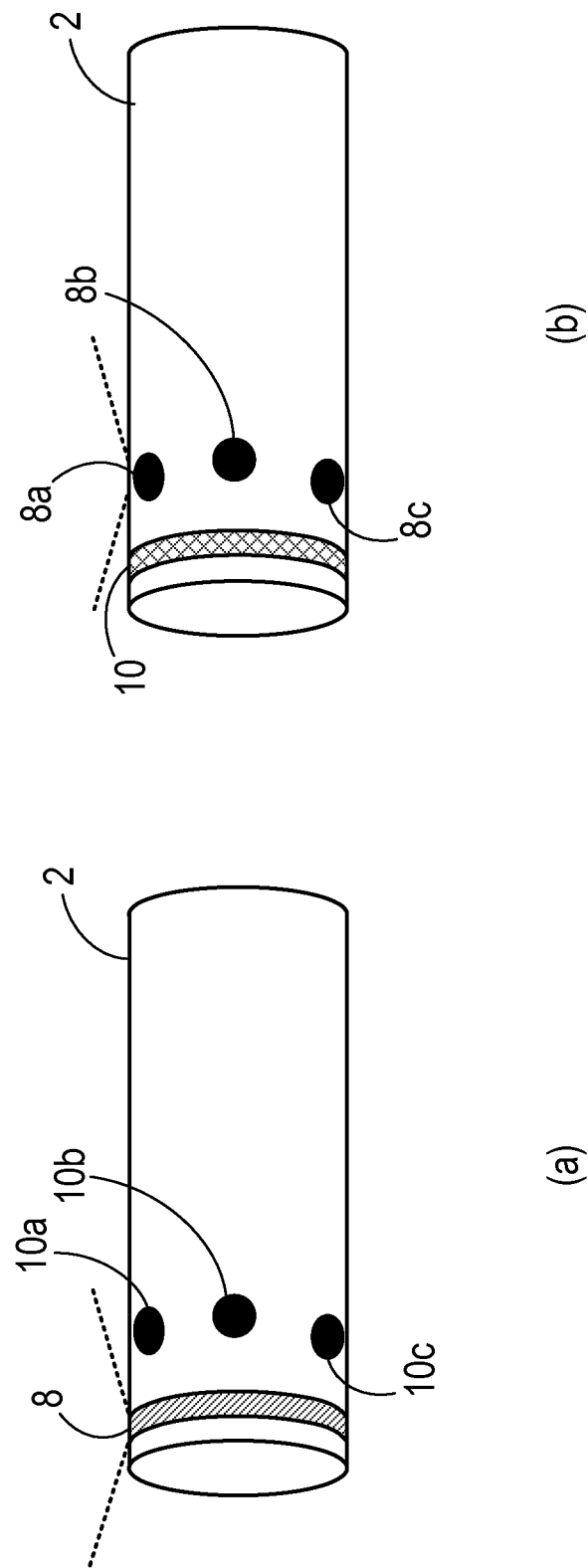
FIG. 4(a) illustrates a third specific embodiment of a handheld personal care device according to the invention and FIG. 4(b) illustrates a fourth specific embodiment of a handheld personal care device according to the invention.

FIG. 4 illustrates two alternative configurations of a handheld personal care device 2 according to the invention. FIG. 4(a) shows an alternative configuration to the device shown in FIG. 2. In this configuration, rather than the light emitting element 8 and the light receiving elements 10a, 10b, 10b being located at opposite ends of the device 2, both the light emitting element 8 and the light receiving elements 10a, 10b, 10c are at the same end of the device 2. FIG. 4(b) shows an alternative configuration to the device shown in FIG. 3. In this configuration, rather than the light emitting elements 8a, 8b, 8c and the light receiving element 10 being located at opposite ends of the device 2, both the light emitting elements 8a, 8b, 8c and the light receiving element 10 are at the same end of the device 2. It will be appreciated that in either of the embodiments shown in FIG. 4, it may be useful to provide some shielding or other component to block line-of-sight between the light emitting element(s) and the light receiving element(s) to prevent any light from the light emitting element(s) directly impinging on the light receiving element(s).

It will be appreciated from the above embodiments that in some cases it may be difficult to estimate a position and/or an orientation of a device 2 where the device 2 is partially or completely rotationally symmetric (e.g. which can mean that users may not always hold the device 2 in the same orientation each time, and thus it may not be possible for the embodiments described above to provide a useful estimate of the position and/or orientation of the device 2 relative to the subject). This problem can be addressed using information on the position or direction of one or more light sources in the environment of the device 2 (referred to as 'external' light sources, since they are external to the device 2 and subject 20), as measured by the one or more light receiving elements 10. Suitable light sources could include a ceiling light, a light mounted on, in or around the reflective surface, a wall mounted light or a window. Since each of these light sources is in a fixed position in the environment around the device 2 and subject 20, the one or more light receiving elements 10 may receive light from this/these light source(s)

(depending on the orientation of the device 2), and the control unit 6 can identify this/these light source(s) in the measurement signal(s).

Figure 5:
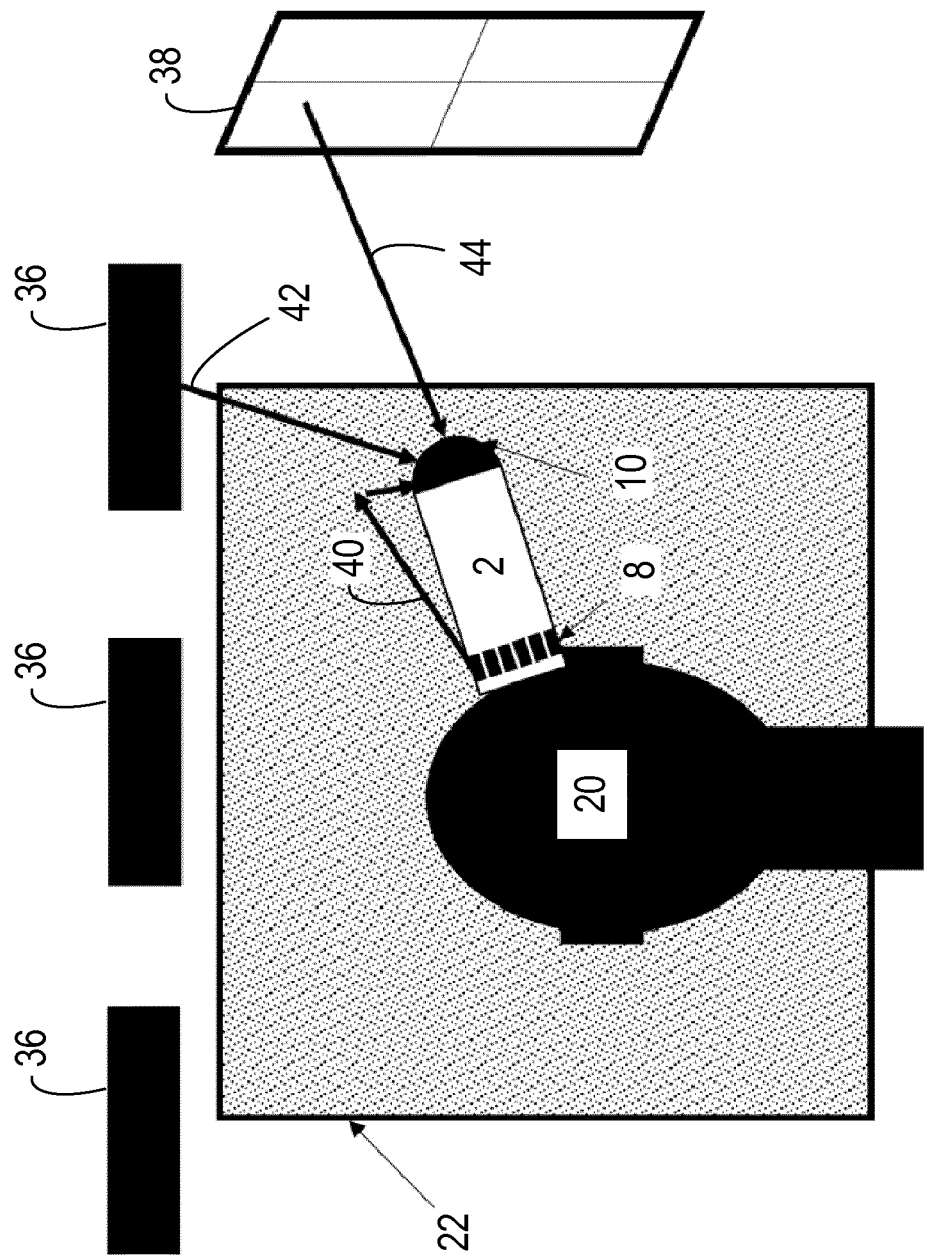
FIG. 5 shows a fifth specific embodiment of a handheld personal care device according to the invention.

FIG. 5 shows an embodiment of a handheld personal care device 2 according to the invention in which the control unit 6 can estimate the position and the orientation of the device 2 relative to the subject 20 by using measurements of one or more light sources in the environment around the device 2 and subject 20. Thus, FIG. 5 shows a subject 20 in front of a reflective surface 22, with three light sources 36 located generally above the reflective surface 22 (for example the light sources 36 can be ceiling lights, wall-mounted lights and/or lights associated with or part of the reflective surface 22). A window 38 is also shown that is to the right of the reflective surface 22 (to the right of the reflective surface 22 from the perspective of the subject 20 when facing the reflective surface 22). It will be appreciated that light coming through the window 38 means that the window 38 acts as a light source.

The device 2 is shown on the right side of the subject 20 and comprises a plurality of light emitting elements 8 arranged at one end of the device 2 and a light receiving element 10 arranged at the other end of the device 2. The light receiving element 10 is able to measure light emitted by the light emitting elements 8, and also the light emitted by the light sources 36 and the light from the window 38. The light receiving elements 10 is also able to provide an indication of the direction from which the light has been received. In a simple embodiment, the light receiving element 10 can be a 'quad' detector that can identify incident light as coming from one of four directions, each direction being associated with a quadrant in the detector. FIG. 5 shows that light from one of the light emitting elements 8 is reflected from the reflective surface 22 to the light receiving element 10 (as shown by arrow 40), and the light receiving element 10 also receives light from the light source 36 (as shown by arrow 42) and window 38 (as shown by arrow 44). The control unit 6 can analyse the measurement signal from the light receiving element 10 and determine the direction of the window 38 relative to the device 2 and the direction of the light source 36 relative to the device 2. It will be appreciated that the control unit 6 may be able to distinguish the light from the light source 36 from the light from the window 38 by the fact that the light source 36 may be modulated in the frequency of the mains electrical supply frequency (e.g. 50 Hertz, Hz or 60 Hz), dependent on the type of artificial lighting used. In addition or alternatively, the control unit 6 may be able to distinguish the light from the light source 36 from the light from the window 38 by analysing the spectral composition of the incident light (which will differ significantly for light from the window 38 and light from the light source 36).

Therefore, in the embodiment shown in FIG. 5, the control unit 6 can determine that the device 2 is on the right side of the subject 20 based on the light received from the light emitting element 8 that is reflected in the reflective surface 22, and determine the orientation of the device 2 based on the direction from which light 42 is received from the light source 36 and from which light 44 is received from the window 38.

It will be appreciated that the orientation detection described with reference to FIG. 5 is merely an example, and it is possible to estimate the orientation of the device 2 just using light from the light source 36, or just using the light from the window 38.

It will also be appreciated that, as there will be a lot of variability in the environments in which the device 2 can be used (e.g. different positions of the light source(s) 36, different positions of windows 38 relative to the reflective surface 22, or no window at all), it may be necessary to perform a calibration procedure in which the subject 20 moves the device 2 into predetermined positions so that the control unit 6 can determine which light emitting element(s) 8 face(s) the reflective surface 22 in certain positions and/or orientations relative to the subject 20 and determine where the light source(s) 36 and/or window 38 are located (i.e. the direction in which they are with respect to the device 2) in those positions/orientations. This calibration procedure can therefore compensate or account for differences or variations in the way that different subjects 20 hold the device 2 during use, and also enable the orientation of the device 2 to be estimated during use of the device 2.

As an alternative to performing a calibration procedure, the control unit 6 can be configured to assume that any external light source is located above the device 2 (e.g. since the light source will typically be in the ceiling or mounted relatively high on a wall). In this way, the control unit 6 can estimate whether the device 2 is in one of two (opposite) orientations based on the observed direction of light from the external light source(s).

Figure 6:
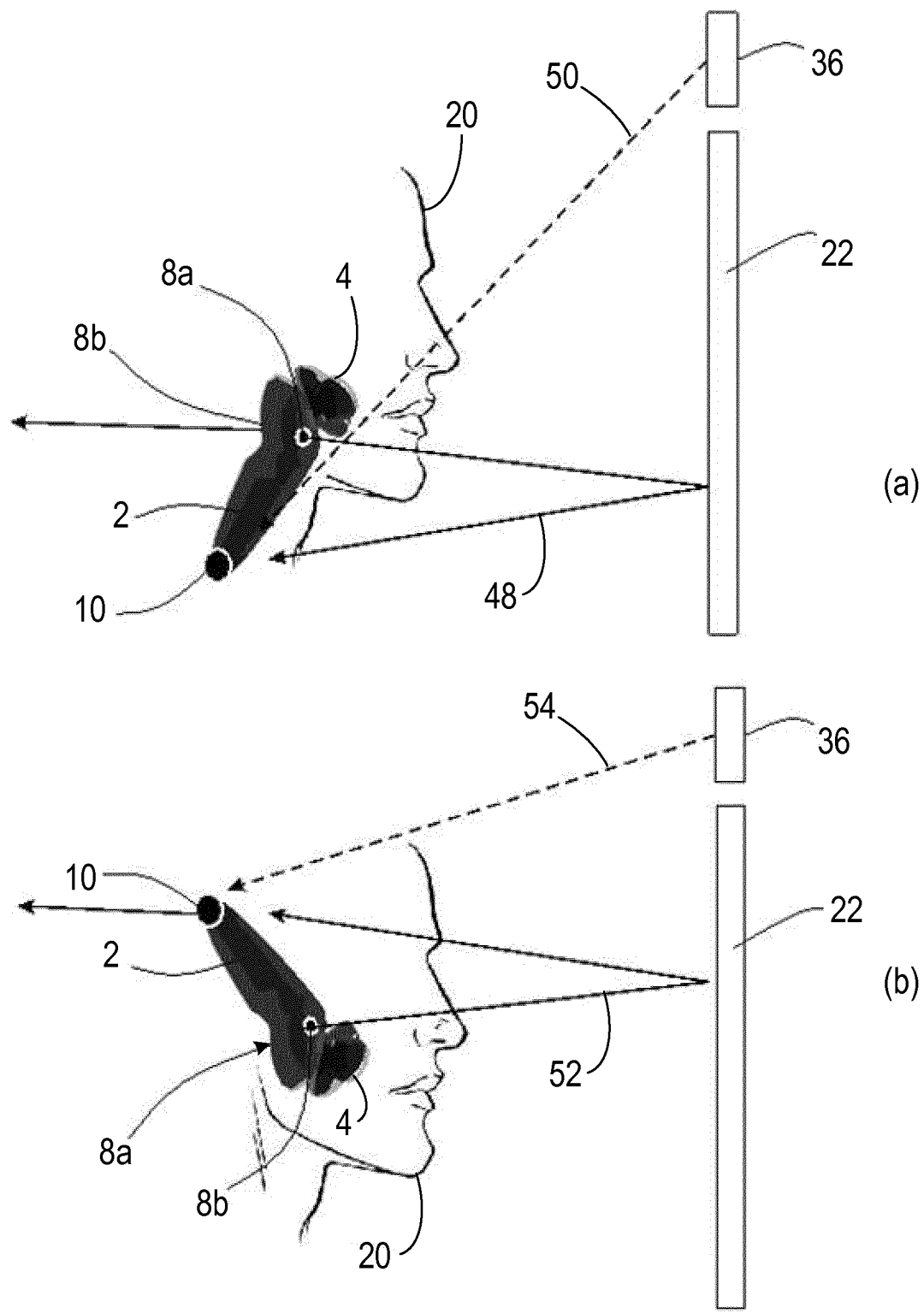
FIG. 6 shows the handheld personal care device according to the fifth specific embodiment in a first orientation relative to a subject (FIG. 6(a)) and in a second orientation relative to a subject (FIG. 6(b))

A further example of a personal care device 2 according to the invention is described below with reference to FIG. 6. FIG. 6 shows a device 2 in the form of an electric shaver 2, that has a first light emitting element 8a and a second light emitting element 8b located on opposite sides of the device 2 (and near the shaving head 4), and a light receiving element 10 located at the opposite end of the device 2, at the end of the handle portion. The light receiving element 10 can provide an indication of the angle of the incident light as described above. The subject 20 is shown side on and is positioned in front of a reflective surface 22, and there is a light source 36 positioned above the reflective surface 22. In FIG. 6(a), the shaving device 2 is being used on the right side of the subject's face 20, with the device 2 in the normal 'upright' orientation (i.e. with the handle portion lower than the shaving head 4). Thus, the light receiving element 10 receives light from the first light emitting element 8a, since the first light emitting element 8a is facing the reflective surface 22 (as indicated by arrow 48), but not from the second light emitting element 8b. The light receiving element 10 also receives light from the light source 36 (indicated by arrow 50) at an angle α (with respect to a measurement axis of the light receiving element 10, which is not shown in FIG. 6(a)). The control unit 6 may be able to identify the light from the light source 36 from other light by virtue of the frequency associated with the light source (e.g. 50 Hz).

In FIG. 6(b), the shaving device 2 is still being used on the right side of the subject's face 20, but now the device 2 is upside down (i.e. not in the normal 'upright' orientation, so the handle portion is higher than the shaving head 4). Thus, the light receiving element 10 now receives light from the second light emitting element 8b, since the second light emitting element 8b is facing the reflective surface 22 (as indicated by arrow 52), but not from the first light emitting element 8a. Without information about the position of the light source 36, the control unit 6 may estimate the position of the device 2 from the received light 52 as being on the left side of the subject 20. However, the light receiving element 10 will also receive light from the light source 36 (indicated by arrow 54) at an angle β (with respect to a measurement axis of the light receiving element 10, which is not shown in FIG. 6(b)). Based on the angle of the light from the light source 36, the control unit 6 can determine that the device 2 is rotated by an angle of 180° with respect to an upright orientation, and therefore also determine that the device 2 is still on the right side of the subject's face 20. Thus, by making use of light from one or more external light sources (and the approximate direction of the light source(s) from the device 2), it is possible to estimate the position and orientation of the device 2.

Table 1 below summarises the possible positions and orientations that can be detected using the embodiment shown in FIG. 6.

TABLE 1

| Light emitting element detected | Angle from light source 36 | Side of subject and orientation |
| --- | --- | --- |
| First light emitting element 8a | α | Right/Down |
| First light emitting element 8a | β | Left/Upright |
| Second light emitting element 8b | α | Left/Down |
| Second light emitting element 8b | β | Right/Upright |

In some embodiments, the device 2 can include one or more sensors that can measure the orientation of the device 2, and the control unit 6 can use the measurements of the orientation in estimating the position and/or the orientation of the device 2 relative to the subject 20. For example the one or more sensors can comprise an accelerometer, a gyroscope, or a gravity sensor or switch. A gravity sensor or switch can be a mechanical switch that is actuated between first and second states based on gravity acting on a switching element. Thus in a first orientation of the switch and the device 2 gravity will cause the switch to be in the first state, and in a second (e.g. opposite) orientation of the switch and the device 2 gravity will cause the switch to be in the second state.

It will be appreciated that the use of one or more sensors that can provide measurements of the orientation of the device 2 means that the orientation of the device 2 can be determined without having to measure the direction of the device relative to an external light source, as in the embodiment of FIGS. 5 and 6.

In further or alternative embodiments, the output of the one or more sensors or mechanical switch indicating the orientation of the device 2 can be used to alter one or more characteristics of the light emitted by the light emitting element(s) 8 based on the orientation of the device 2. In other words, one or more characteristics of the emitted light can be varied based on the orientation of the device 2. This change in characteristics can be detected by the control unit 6 by analysing the measurement signal from the light receiving element(s) 10. For example, in a first orientation of the device 2, the light emitting element(s) 8 can emit light with a first set of characteristics (e.g. wavelength, modulation, duty cycle, polarisation, etc.) and in a second orientation of the device 2 (e.g. an opposite orientation), the light emitting element(s) 8 can emit light with a second set of characteristics (e.g. wavelength, modulation, duty cycle, polarisation, etc.). In this way, the control unit 6 can estimate the orientation of the device 2 from the characteristics of the light received by the light receiving element(s) 10, and use this information in estimating the position of the device 2 relative to the subject 20 based on whether and/or which of the one or more light emitting elements 8 each of the one or more light receiving elements 10 has received light from.

Figure 7:
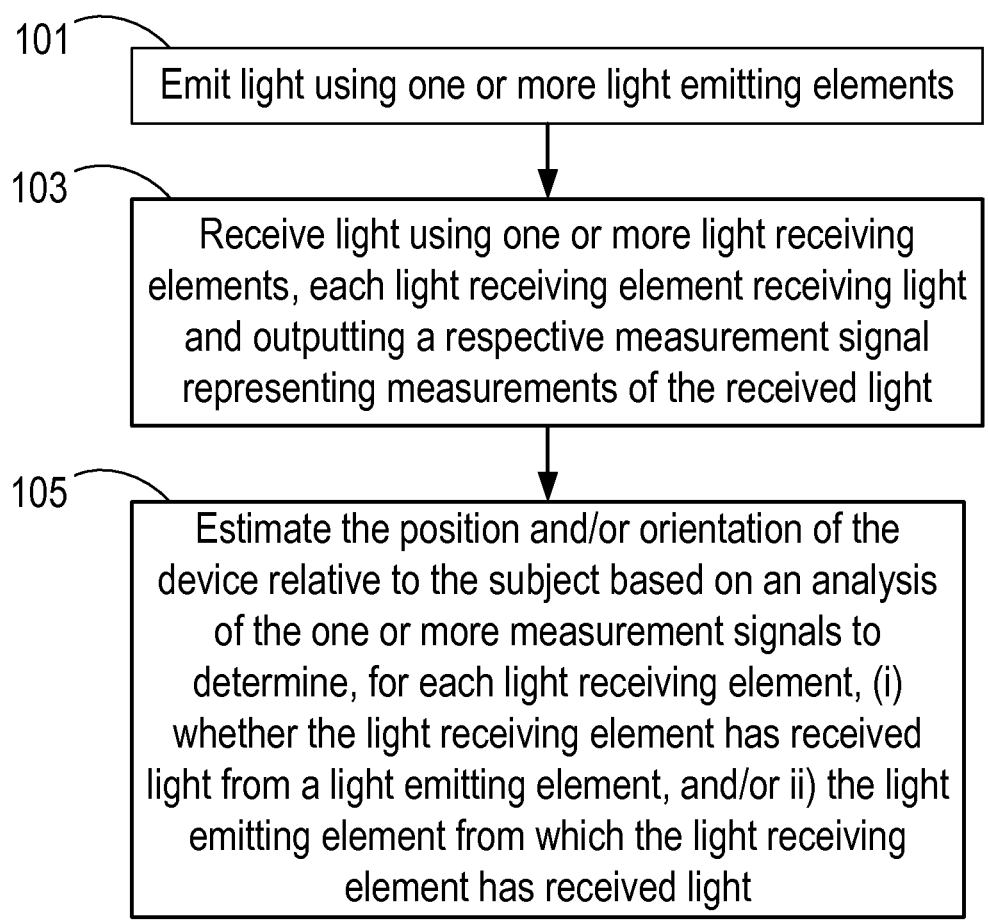
FIG. 7 is a flow chart of a method of estimating a position and/or an orientation of a handheld personal care device relative to a subject according to the invention.

The flow chart in FIG. 7 illustrates a method of estimating a position and/or an orientation of a device 2 relative to a subject 20. It will be appreciated that the method in FIG. 7 can be performed by any of the embodiments of the device 2 as described here before, for example by or under the control of the control unit 6. The method in FIG. 7 can be performed while the device 2 is being used to perform a personal care activity on the subject 20.

In a first step, step 101, the one or more light emitting elements 8 are used to emit light. Thus, this step can comprise the control unit 6 controlling the one or more light emitting elements 8 to emit light.

Next, in step 103, one or more light receiving elements 10 are used to receive light. Each of the one or more light receiving elements 10 receives light and outputs a respective measurement signal representing measurements of the received light. The respective measurement signal(s) of the one or more light receiving elements 10 is/are provided to the control unit 6 for analysis.

Then, in step 105, the position and/or the orientation of the device 2 relative to the subject is estimated based on an analysis of the respective measurement signals of the one or more light receiving elements 10. In particular, depending on the number and/or the configuration of the one or more light emitting elements 8 and the one or more light receiving elements 10, the control unit 6 can determine, for each of the one or more light receiving element 10, whether the light receiving element 10 has received light from any of the one or more light emitting element 10, and/or from which of the one or more light emitting element 8 the light receiving element 10 has received light.

It will be appreciated that the effect of the step of estimating (step 105) is to determine which of the one or more light emitting elements and which of the one or more light receiving elements are facing the reflective surface. In that case, the position and/or the orientation of the device relative to the subject is estimated based on which of the one or more light emitting elements and which of the one or more light receiving elements are determined to be facing the reflective surface.

In a specific embodiment, for example as described above with reference to FIG. 2, the device 2 can comprise one single light emitting element 8 and a plurality of light receiving elements 10, with the light emitting element 8 and the plurality of light receiving elements 10 being arranged on the device 2 such that, depending on the position and/or the orientation of the device 2 relative to the subject 20, at least one of the plurality of light receiving elements 10 can receive light emitted by the light emitting element 8 after reflection of said light by the reflective surface 22. In that case, step 105 comprises determining, from the respective measurement signals of the plurality of light receiving elements 10, which of the plurality of light receiving elements 10 has received light from the light emitting element 8, and estimating the position and/or the orientation of the device 2 relative to the subject based on which of the plurality of light receiving elements 10 has received light from the light emitting element 8. As noted above, this embodiment can be used to estimate whether the device 2 is on the left or right side of the face of the subject 20.

In some embodiments, also as described above with reference to FIG. 2, a first one of the plurality of light receiving elements 10 can be arranged on a first side of the device 2 such that, in a first position and/or a first orientation of the device 2 relative to the subject, said first one of the plurality of light receiving elements 10 receives light from the light emitting element 8 after reflection of said light by the reflective surface 22, and a second one of the plurality of light receiving elements 10 can be arranged on a second side of the device 2 (with the first and second sides being opposite or different sides) such that, in a second position and/or a second orientation of the device 2 relative to the subject, said second one of the plurality of light receiving elements 10 receives light from the light emitting element 8 after reflection of said light by the reflective surface 22. It will be appreciated that the arranging of the plurality of light receiving elements 10 on different sides of the device 2 results in the light receiving elements 10 facing (i.e. receiving light from) different directions. In some embodiments, the first position and/or first orientation can be a position on the left side of the face of the subject 20, and the second position and/or second orientation can be a position on the right side of the face of the subject 20 (or vice versa).

In these embodiments, said first one of the plurality of light receiving elements 10 is arranged on the first side of the device 2 such that said first one of the plurality of light receiving elements 10 does not receive light from the light emitting element 8 when the device 2 is in the second position and/or the second orientation, and said second one of the plurality of light receiving elements 10 is arranged on the second side of the device 2 such that said second one of the plurality of light receiving elements 10 does not receive light from the light emitting element 8 when the device 2 is in the first position and/or the first orientation.

In another specific embodiment, for example as described above with reference to FIG. 3, the device 2 can comprise a plurality of light emitting elements 8 and one single light receiving element 10, with the plurality of light emitting elements 8 and the light receiving element 10 being arranged on the device 2 such that, depending on the position and/or the orientation of the device 2 relative to the subject 20, the light receiving element 10 receives light from at least one of the plurality of light emitting elements 8 after reflection of said light from the reflective surface 22. In that case, step 105 comprises determining, from the measurement signal of the light receiving element 10, which of the plurality of light emitting elements 8 the light receiving element 10 has received light from, and estimating the position and/or the orientation of the device 2 based on which of the plurality of light emitting elements 8 the light receiving element 10 has received light from.

In some embodiments, also described above with reference to FIG. 3, a first one of the plurality of light emitting elements 8 is arranged on a first side of the device 2 such that, in a first position and/or a first orientation of the device 2 relative to the subject, the light receiving element 10 receives light from said first one of the plurality of light emitting elements 8 after reflection of said light by the reflective surface 22, and a second one of the plurality of light emitting elements 8 is arranged on a second side of the device 2 (with the first and second sides being opposite or different sides) such that, in a second position and/or a second orientation of the device 2 relative to the subject, the light receiving element 10 receives light from said second one of the plurality of light emitting elements 8 after reflection of said light by the reflective surface 22. It will be appreciated that the arranging of the plurality of light emitting elements 8 on different sides of the device 2 results in the light emitting elements 8 facing (i.e. emitting light in) different directions. In some embodiments, the first position and/or first orientation can be a position on the left side of the face of the subject 20, and the second position and/or second orientation can be a position on the right side of the face of the subject 20 (or vice versa).

In these embodiments, said first one of the plurality of light emitting elements 8 is arranged on the first side of the device 2 such that the light receiving element 10 does not receive light from said first one of the plurality of light emitting elements 8 when the device 2 is in the second position and/or the second orientation, and said second one of the plurality of light emitting elements 8 is arranged on the second side of the device 2 such that the light receiving element 10 does not receive light from said second one of the plurality of light emitting elements 8 when the device 2 is in the first position and/or orientation.

In yet another specific embodiment, the device 2 comprises one single light emitting element 8 and one single light receiving element 10 that are arranged on the device 2 such that, in a first position and/or a first orientation of the device 2 relative to the subject, the light receiving element 10 receives light from the light emitting element 8 after reflection of said light by the reflective surface 22, and in a second position and/or a second orientation of the device 2 relative to the subject, the light receiving element 10 does not receive light from the light emitting element 8. In that case, step 105 can comprise determining, from the measurement signal of the light receiving element 10, whether the light receiving element 10 has received light from the light emitting element 8, and estimating whether the device 2 is in the first position and/or first orientation or in the second position and/or second orientation based on whether the light receiving element 10 has received light from the light emitting element 8. In some embodiments, the first position and/or first orientation can be a position on the left side of the face of the subject 20, and the second position and/or second orientation can be a position on the right side of the face of the subject 20 (or vice versa).

In yet another specific embodiment, the device 2 comprises a plurality of light emitting elements 8 and a plurality of light receiving elements 10, with the plurality of light emitting elements 8 and the plurality of light receiving elements 10 being arranged on the device 2 such that, depending on the position and/or the orientation of the device 2 relative to the subject 20, at least one of the plurality of light receiving elements 10 can receive light emitted by at least one of the light emitting elements 8 after reflection of said light by the reflective surface 22. In this case step 105 can comprise determining, from the respective measurement signals of the plurality of light receiving elements 10, which of the plurality of light receiving elements 10 has received light from which of the plurality of light emitting elements 8 (e.g. determining that a first one of the plurality of light receiving elements 10 has received light from both a first one and a second one of the plurality of light emitting elements 8, and that a second one of the plurality of light receiving elements 10 has not received light from any of the plurality of light emitting elements 8), and estimating the position and/or the orientation of the device 2 based on which of the plurality of light receiving elements 10 has received light from which of the plurality of light emitting elements 8.

In some embodiments, the method can also comprise analysing each respective measurement signal of the one or more light receiving elements 10 to determine whether the respective light receiving element 10 has received light from an external light source 36 in the environment of the subject 20 (for example as described above with reference to FIGS. 5 and 6). In these embodiments, the position and/or the orientation of the device 2 relative to the subject 20 can be estimated based on whether at least one of the one or more light receiving elements 10 has received light from the external light source 36. The presence of light from the external light source 36 in one or more of the measurement signals can be used to determine the orientation of the device 2, since the position of the external light source 36 in the environment may be known (e.g. predetermined, such as during a calibration procedure).

In some embodiments, the one or more light receiving elements 10 are each configured to output a respective measurement signal representing measurements of the received light and indicating a direction from which the received light has been received. The method can then further comprise analysing each respective measurement signal of the one or more light receiving elements 10 to determine whether the respective light receiving element 10 has received light from an external light source 36 in the environment of the subject 20 and the direction of the external light source 36 relative to the device 2. This information can be used to estimate the position and/or the orientation of the device 2 relative to the subject 20 based on whether any of the one or more light receiving elements 10 has received light from the external light source 36 and the direction of the external light source 36 relative the device 2.

In some embodiments, the method can further comprise the step of measuring the orientation of the device 2 using one or more sensors. In some embodiments, the orientation can be measured with respect to the direction of gravity, for example using an accelerometer, a gyroscope, etc. This embodiment enables the orientation of the device 2 with respect to a vertical axis to be determined, with the position of the device 2 relative to the subject 20 being determined from the measurement signal(s) from the one or more light receiving elements 10.

In some embodiments, once the position and/or the orientation of the device 2 is estimated in step 105, one or more operating parameters of a personal care component 4 in the device 2 can be adjusted based on the estimated position and/or the estimated orientation of the device 2 relative to the subject 20. For example, a direction and/or a speed of rotation of an actuated element could be changed based on the estimated position and/or orientation of the device 2 relative to the subject 20.

In embodiments where a plurality of light emitting elements 8 are used, step 101 can comprise emitting light from each of the plurality of light emitting elements 8 that is distinguishable from the light emitted by each other of the plurality of light emitting elements 8. For example, each of the plurality of light emitting elements 8 can emit light at a respective wavelength (colour). Alternatively or in addition, each of the plurality of light emitting elements 8 can emit light with a respective modulation pattern (e.g. frequency and/or amplitude modulation). Alternatively or in addition, each of the plurality of light emitting elements 8 can emit light with a respective polarisation. Each of these embodiments ensures that, for each of the one or more light receiving elements 10, it can be determined from which of the one or more light emitting elements 8 light has been received.

There is therefore provided an improved technique for estimating the position and/or the orientation of a handheld personal device relative to a subject.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A handheld personal care device, comprising:
   one or more light emitting elements, each configured to emit light;
   one or more light receiving elements, each configured to receive light and to output a respective measurement signal representing measurements of the received light; and
   a control unit that is configured to estimate a position and/or an orientation of the device relative to a subject;
   wherein: the one or more light emitting elements and the one or more light receiving elements are arranged on the device such that, depending on the position and/or the orientation of the device relative to the subject, at least one of the one or more light receiving elements can receive light emitted by at least one of the one or more light emitting elements and reflected by a reflective surface in an environment of the subject; the control unit is configured to estimate the position and/or the orientation of the device relative to the subject based on an analysis of the respective measurement signals of the one or more light receiving elements to determine, for each of the one or more light receiving elements, (i) whether the light receiving element has received light from at least one of the one or more light emitting elements, and (ii) from which of the one or more light emitting elements the light receiving element has received light; and the one or more light emitting elements and the one or more light receiving elements are arranged on different faces or surfaces of the handheld personal care device and without a structure disposed between the light emitting elements and the light receiving elements such that there is no direct line of sight from any of the one or more light emitting elements to any of the one or more light receiving elements, so that light is prevented from leaking from the one or more light emitting elements directly to the one or more light receiving elements.

2. The handheld personal care device as claimed in claim 1, wherein the control unit is configured to determine from the analysis of the respective measurement signals of the one or more light receiving elements which of the one or more light emitting elements and which of the one or more light receiving elements are facing the reflective surface.

3. The handheld personal care device as claimed in claim 2, wherein the control unit is configured to estimate the position and/or the orientation of the device relative to the subject based on which of the one or more light emitting elements and which of the one or more light receiving elements are determined to be facing the reflective surface.

4. The handheld personal care device as claimed in claim 1, wherein the device comprises one single light emitting element and a plurality of light receiving elements, wherein the light emitting element and the plurality of light receiving elements are arranged on the device such that, depending on the position and/or the orientation of the device relative to the subject, at least one of the plurality of light receiving elements can receive light emitted by the light emitting element and reflected by the reflective surface; and wherein the control unit is configured to determine from the respective measurement signals of the plurality of light receiving elements which of the plurality of light receiving elements has received light from the light emitting element, and to estimate the position and/or the orientation of the device relative to the subject based on which of the plurality of light receiving elements has received light from the light emitting element.

5. The handheld personal care device as claimed in claim 4, wherein a first one of the plurality of light receiving elements is arranged on a first side of the device such that, in a first position and/or a first orientation of the device relative to the subject, said first one of the plurality of light receiving elements receives light from the light emitting element reflected by the reflective surface, and wherein a second one of the plurality of light receiving elements is arranged on a second side of the device, wherein the first side is different to the second side, such that, in a second position and/or a second orientation of the device relative to the subject, the second one of the plurality of light receiving elements receives light from the light emitting element reflected by the reflective surface.

6. The handheld personal care device as claimed in claim 1, wherein the device comprises a plurality of light emitting elements and one single light receiving element, wherein the plurality of light emitting elements and the light receiving element are arranged on the device such that, depending on the position and/or the orientation of the device relative to the subject, the light receiving element can receive light emitted by at least one of the plurality of light emitting elements and reflected by the reflective surface; and
wherein the control unit is configured to determine from the measurement signal of the light receiving element which of the plurality of light emitting elements the light receiving element has received light from, and to estimate the position and/or the orientation of the device relative to the subject based on which of the plurality of light emitting elements the light receiving element has received light from.

7. The handheld personal care device as claimed in claim 6, wherein a first one of the plurality of light emitting elements is arranged on a first side of the device such that, in a first position and/or a first orientation of the device relative to the subject, the light receiving element receives light from said first one of the plurality of light emitting elements reflected by the reflective surface, and wherein a second one of the plurality of light emitting elements is arranged on a second side of the device, wherein the first side is different to the second side, such that, in a second position and/or a second orientation of the device relative to the subject, the light receiving element receives light from said second one of the plurality of light emitting elements reflected by the reflective surface.

8. The handheld personal care device as claimed in claim 1, wherein the device comprises one single light emitting element and one single light receiving element that are arranged on the device such that, in a first position and/or a first orientation of the device relative to the subject, the light receiving element can receive light emitted by the light emitting element and reflected by the reflective surface and, in a second position and/or a second orientation of the device relative to the subject, the light receiving element cannot receive light from the light emitting element; and
wherein the control unit is configured to determine from the measurement signal of the light receiving element whether the light receiving element has received light from the light emitting element, and to estimate whether the device is in the first position and/or the first orientation or in the second position and/or second orientation relative to the subject based on whether the light receiving element has received light from the light emitting element.

9. The handheld personal care device as claimed in claim 1, wherein the control unit is configured to analyze each respective measurement signal of the one or more light receiving elements to determine whether at least one of the one or more light receiving elements has received light from an external light source in the environment of the subject; and
wherein the control unit is further configured to estimate the position and/or the orientation of the device relative to the subject based on whether at least one of the one or more light receiving elements has received light from the external light source.

10. The handheld personal care device as claimed in claim 1, wherein the one or more light receiving elements are each configured to output a respective measurement signal representing measurements of the received light and indicating a direction from which the received light has been received;
wherein the control unit is configured to analyze each respective measurement signal of the one or more light receiving elements to determine whether at least one of the one or more light receiving elements has received light from an external light source in the environment of the subject and to determine the direction of the external light source relative to the device; and
wherein the control unit is further configured to estimate the position and/or the orientation of the device relative to the subject based on whether at least one of the one or more light receiving elements has received light from the external light source and the direction of said external light source relative to the device.

11. A method of estimating a position and/or an orientation of a handheld personal care device relative to a subject, the device comprising one or more light emitting elements and one or more light receiving elements, the method comprising:
emitting light using the one or more light emitting elements;
receiving light using the one or more light receiving elements, each of the one or more light receiving elements receiving light and outputting a respective measurement signal representing measurements of the received light;
wherein: the one or more light emitting elements and the one or more light receiving elements are arranged on the device such that, depending on the position and/or the orientation of the device relative to the subject, at least one of the one or more light receiving elements can receive light emitted by at least one of the one or more light emitting elements and reflected by a reflective surface in an environment of the subject; and
estimating the position and/or the orientation of the device relative to the subject based on an analysis of the respective measurement signals of the one or more light receiving elements to determine, for each of the one or more light receiving elements, (i) whether the light receiving element has received light from at least one of the one or more light emitting elements, and (ii) from which of the one or more light emitting elements the light receiving element has received light, wherein the one or more light emitting elements and the one or more light receiving elements are arranged on different faces or surfaces of the handheld personal care device and without a structure disposed between the light emitting elements and the light receiving elements such that there is no direct line of sight from any of the one or more light emitting elements to any of the one or more light receiving elements, so that light is prevented from leaking from the one or more light emitting elements directly to the one or more light receiving elements.

12. The method as claimed in claim 11, wherein the step of estimating comprises determining from the analysis of the respective measurement signals of the one or more light receiving elements which of the one or more light emitting elements and which of the one or more light receiving elements are facing the reflective surface, and estimating the position and/or the orientation of the device relative to the subject based on which of the one or more light emitting elements and which of the one or more light receiving elements are determined to be facing the reflective surface.

13. The method as claimed in claim 11, wherein the device comprises one single light emitting element and a plurality of light receiving elements, wherein the light emitting element and the plurality of light receiving elements are arranged on the device such that, depending on the position and/or the orientation of the device relative to the subject, at least one of the plurality of light receiving elements can receive light emitted by the light emitting element and reflected by the reflective surface; and
wherein the step of estimating comprises determining from the respective measurement signals of the plurality of light receiving elements which of the plurality of light receiving elements has received light from the light emitting element, and estimating the position and/or the orientation of the device relative to the subject based on which of the plurality of light receiving elements has received light from the light emitting element.

14. The method as claimed in claim 11, wherein the device comprises a plurality of light emitting elements and one single light receiving element; wherein the plurality of light emitting elements and the light receiving element are arranged on the device such that, depending on the position and/or the orientation of the device relative to the subject, the light receiving element can receive light emitted by at least one of the plurality of light emitting elements and reflected by the reflective surface; and
wherein the step of estimating comprises determining from the measurement signal of the light receiving element which of the plurality of light emitting elements the light receiving element has received light from, and estimating the position and/or the orientation of the device relative to the subject based on which of the plurality of light emitting elements the light receiving element has received light from.

15. The method as claimed in claim 11, wherein the device comprises one single light emitting element and one single light receiving element that are arranged on the device such that, in a first position and/or a first orientation of the device relative to the subject, the light receiving element can receive light emitted by the light emitting element and reflected by the reflective surface and, in a second position and/or a second orientation of the device relative to the subject, the light receiving element cannot receive light from the light emitting element; and
wherein the step of estimating comprises determining from the measurement signal of the light receiving element whether the light receiving element has received light from the light emitting element, and estimating whether the device is in the first position and/or the first orientation or the second position and/or the second orientation based on whether the light receiving element has received light from the light emitting element.

16. A handheld personal care device, comprising:
one or more light emitting elements, each configured to emit light;
one or more light receiving elements, each configured to receive light and to output a respective measurement signal representing measurements of the received light; and
a control unit that is configured to estimate a position and/or an orientation of the device relative to a subject;
wherein: the control unit is configured to estimate the position and/or the orientation of the device relative to the subject based on an analysis of measurement signals of the one or more light receiving elements to determine (i) whether the light receiving element has received light from at least one of the one or more light emitting elements, and (ii) from which of the one or more light emitting elements the light receiving element has received light; and the one or more light emitting elements and the one or more light receiving elements are arranged on different faces or surfaces of the handheld personal care device and without a structure disposed between the light emitting elements and the light receiving elements such that there is no direct line of sight from any of the one or more light emitting elements to any of the one or more light receiving elements, so that light is prevented from leaking from the one or more light emitting elements directly to the one or more light receiving elements.

17. The handheld personal care device as claimed in claim 16, wherein the control unit is configured to determine from the analysis of the respective measurement signals of the one or more light receiving elements which of the one or more light emitting elements and which of the one or more light receiving elements are facing a reflective surface.

18. The handheld personal care device as claimed in claim 17, wherein the control unit is configured to estimate the position and/or the orientation of the device relative to the subject based on which of the one or more light emitting elements and which of the one or more light receiving elements are determined to be facing a reflective surface.

19. The handheld personal care device as claimed in claim 16, wherein the device comprises one single light emitting element and a plurality of light receiving elements, wherein the light emitting element and the plurality of light receiving elements are arranged on the device such that, depending on the position and/or the orientation of the device relative to the subject, at least one of the plurality of light receiving elements can receive light emitted by the light emitting element and reflected by a reflective surface; and
wherein the control unit is configured to determine from the respective measurement signals of the plurality of light receiving elements which of the plurality of light receiving elements has received light from the light emitting element, and to estimate the position and/or the orientation of the device relative to the subject based on which of the plurality of light receiving elements has received light from the light emitting element.

20. The handheld personal care device as claimed in claim 19, wherein a first one of the plurality of light receiving elements is arranged on a first side of the device such that, in a first position and/or a first orientation of the device relative to the subject, said first one of the plurality of light receiving elements receives light from the light emitting element reflected by the reflective surface, and wherein a second one of the plurality of light receiving elements is arranged on a second side of the device, wherein the first side is different to the second side, such that, in a second position and/or a second orientation of the device relative to the subject, the second one of the plurality of light receiving elements receives light from the light emitting element reflected by the reflective surface.

* * * * *